US012724960B2

(12) United States Patent
Weiss et al.

(10) Patent No.: US 12,724,960 B2
(45) Date of Patent: Sep. 1, 2026

(54) COMMUNICATION PLATFORM INTERACTIVE TRANSCRIPTS

(71) Applicant: Salesforce, Inc., San Francisco, CA (US)

(72) Inventors: Noah Weiss, Austin, TX (US); Julie Haynes, Oakland, CA (US); John Rodgers, Vancouver (CA); Anna Niess, Hastings-on-Hudson, NY (US); Dolapo Falola, Brooklyn, NY (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/588,683

(22) Filed: Jan. 31, 2022

(65) Prior Publication Data

US 2023/0244857 A1 Aug. 3, 2023

(51) Int. Cl.
*G06F 40/169* (2020.01)
*G06F 3/04842* (2022.01)
(Continued)

(52) U.S. Cl.
CPC ........ *G06F 40/169* (2020.01); *G06F 3/04842* (2013.01); *G06F 40/106* (2020.01); *G10L 15/22* (2013.01); *G10L 15/26* (2013.01); *G10L 25/57* (2013.01); *G11B 27/036* (2013.01); *G06Q 10/1093* (2013.01)

(58) Field of Classification Search
CPC .. G06F 40/169; G06F 40/106; G06F 3/04842; G10L 15/22; G10L 15/26; G10L 25/57; G11B 27/036; G06Q 10/1095
See application file for complete search history.

(56) References Cited

U.S. PATENT DOCUMENTS 10,248,934 B1 4/2019 Shin
10,353,997 B1 * 7/2019 Tobias ................ G06V 30/414
(Continued)

OTHER PUBLICATIONS

Vibhanshu Dixit, "How to Use Fireflies.ai: An Easy Step-by-Step Guide 2022 (Updated)", Nov. 17, 2021, Fireflies.ai Blog., pp. 1-26. (Year: 2021).*

(Continued)

*Primary Examiner* — Kieu D Vu
*Assistant Examiner* — David V Luu
(74) *Attorney, Agent, or Firm* — Lee & Hayes, P.C.

(57) ABSTRACT

Techniques for providing an interactable meeting transcript associated with a meeting via a virtual space of a communication platform are described herein. In at least one example, a user requests to conduct an audio or video meeting associated with a virtual space of the communication platform. The communication platform receives data representative of the meeting, generates a meeting transcript associated with the meeting based on the data, and causes presentation of the meeting transcript via the virtual space. In at least one example, the communication platform receives, from a user of the virtual space, an indication of a selection of a section of the meeting transcript, and causes an input interface to be presented, enabling the user of the virtual space to comment on the section of the meeting transcript. In response to receiving the comment, the communication platform updates a file associated with the meeting to include the comment.

20 Claims, 14 Drawing Sheets

(51) Int. Cl.

| | |
|---|---|
| ***G06F 40/106*** | (2020.01) |
| ***G06Q 10/1093*** | (2023.01) |
| ***G10L 15/22*** | (2006.01) |
| ***G10L 15/26*** | (2006.01) |
| ***G10L 25/57*** | (2013.01) |
| ***G11B 27/036*** | (2006.01) |

(56) References Cited

U.S. PATENT DOCUMENTS

| | | | | |
|---|---|---|---|---|
| 2004/0237032 | A1* | 11/2004 | Miele | G06F 40/169 715/201 |
| 2007/0174326 | A1* | 7/2007 | Schwartz | G06F 16/433 707/999.102 |
| 2007/0244700 | A1* | 10/2007 | Kahn | G10L 15/22 704/E15.04 |
| 2008/0276159 | A1* | 11/2008 | Narayanaswami | G06F 40/169 715/202 |
| 2012/0236201 | A1* | 9/2012 | Larsen | H04N 21/242 348/468 |
| 2013/0058471 | A1* | 3/2013 | Garcia | H04M 3/42221 379/202.01 |
| 2013/0110565 | A1* | 5/2013 | Means, Jr. | G06Q 10/063 705/7.11 |
| 2014/0169767 | A1* | 6/2014 | Goldberg | G06Q 10/10 386/282 |
| 2014/0328472 | A1* | 11/2014 | Fitzsimmons | H04L 65/765 379/85 |
| 2015/0003595 | A1* | 1/2015 | Yaghi | H04M 3/5175 379/85 |
| 2015/0012448 | A1* | 1/2015 | Bleiweiss | G06Q 50/18 705/311 |
| 2015/0067057 | A1* | 3/2015 | Brekke | H04L 67/02 709/204 |
| 2018/0039634 | A1* | 2/2018 | Goldstein | G06F 16/353 |
| 2018/0053510 | A1* | 2/2018 | Kofman | G11B 27/34 |
| 2018/0211552 | A1* | 7/2018 | Samuelson | G06F 16/7844 |
| 2018/0287982 | A1 | 10/2018 | Draeger et al. | |
| 2019/0129973 | A1* | 5/2019 | Truong | G06F 16/93 |
| 2019/0272902 | A1* | 9/2019 | Vozila | G06N 20/00 |
| 2019/0311331 | A1* | 10/2019 | Steinhoff | G06V 40/103 |
| 2021/0058585 | A1* | 2/2021 | Hegde | H04N 21/42204 |
| 2021/0157834 | A1* | 5/2021 | Sivasubramanian | G06F 16/686 |
| 2021/0158234 | A1* | 5/2021 | Sivasubramanian | G10L 15/26 |
| 2021/0165973 | A1* | 6/2021 | Kofman | G06F 40/30 |
| 2021/0193148 | A1* | 6/2021 | Kumar | G06F 3/165 |
| 2021/0342785 | A1* | 11/2021 | Mann | G06F 40/18 |
| 2022/0115020 | A1* | 4/2022 | Bradley | G06F 3/0334 |
| 2022/0210268 | A1* | 6/2022 | Cole | H04M 3/5141 |
| 2022/0374585 | A1* | 11/2022 | Wang | G11B 27/031 |
| 2022/0391083 | A1* | 12/2022 | Strader | G06F 3/04855 |

OTHER PUBLICATIONS

"How to Add Notes or Comments", Jun. 3, 2021/2years ago, Fireflies Help Center, pp. 1-6 (Year: 2021).*

Author: Hersey House. Title: Edit a form in Power Apps and restricting edits for a certain time frame. Publisher: YouTube. Publication Date: Feb. 21, 2021. URL: https://www.youtube.com/watch?v=oizcBqkqlyE.*

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims To Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield On How Slack Became A $2.8 Billion Unicorn", Forbes, [online] [retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat> (dated May 28, 2019) 21 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516> (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459. txt>. (dated May 1993) 57 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

PCT Search Report and Written Opinion mailed May 22, 2023 for PCT application No. PCT/US23/61063, 13 pages.

Office Action for related European Application No. 23707589.0, Dated Jun. 6, 2025, 7 pages.

* cited by examiner

600B

612

616

604

618

620

622

608

USER Z (ADMIN)

- UNREADS
- THREADS
- M & R
- CONNECT
- MORE

▼ CHANNELS
- CHANNEL A
- MEETING A
- CHANNEL D
- CHANNEL F

▼ DIRECT MESSAGES
- USER B
- USERS D AND E
- MEETING ZDE

▶ DOCUMENTS

▶ APPS

SEARCH:

TRANSCRIPT OF MEETING A

BOT 3:43PM

TRANSCRIPT OF MEETING A – JANUARY 17, 2022

00:15 HEY, WE'RE HERE TO SYNC ON ... PASS THE MIC. USER B?

RENDER THIS SECTION (1) SELECTABLE

RENDER THIS SECTION (1) NOT SELECTABLE

00:25 USER B

THANKS USER Z. FIRST, LET'S TALK ABOUT HOW WE ARE GOING TO SOLVE ISSUE A. ... YOU, BUT WE'RE ALWAYS OPEN TO ...

RENDER THIS SECTION (2) SELECTABLE

RENDER THIS SECTION (2) NOT SELECTABLE

IN ADDITION, WE WOULD LIKE TO GET YOUR FEEDBACK ON THE OPTIONS PRESENTED TODAY VIA A POLL, WHICH WILL BE AVAILABLE VIA THE CHANNEL. THANKS IN ADVANCE FOR YOUR INPUT. YOU CAN ALSO SUBMIT IDEAS FOR ADDITIONAL OPTIONS IN A THREAD OF THE TRANSCRIPT. JUST SELECT THIS SECTION AND GIVE US YOUR INPUT! THE POLL WILL ALSO INCLUDE AN OPTION TO INCLUDE ADDITIONAL OPTIONS, WHICH YOU CAN SELECT TO SUBMIT ANONYMOUSLY, IF YOU ARE MORE COMFORTABLE WITH THAT. WE REALLY WANT TO MAKE THIS PROCESS AS COLLABORATIVE AND INCLUSIVE AS POSSIBLE.

01:05 USER Z

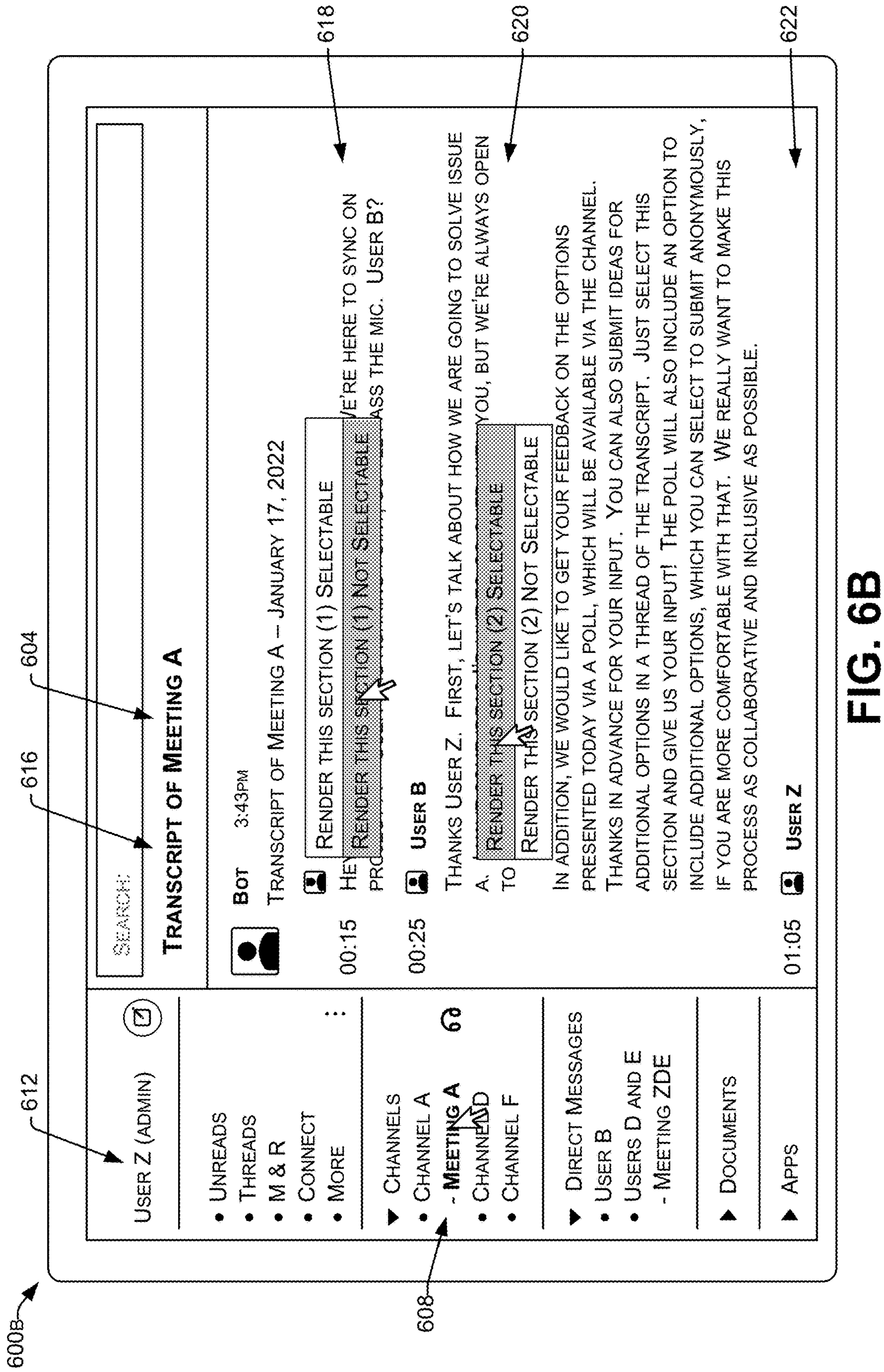

RECEIVE, FROM A USER ACCOUNT OF A USER, A SELECTION OF A MEETING TRANSCRIPT PUBLISHED VIA A VIRTUAL SPACE OF A COMMUNICATION PLATFORM
802

IDENTIFY A SECTION OF THE MEETING TRANSCRIPT ASSOCIATED WITH THE SELECTION
804

SECTION DESIGNATED AS SELECTABLE FOR COMMENTING?
806

NO

CAUSE DISPLAY OF A NOTIFICATION THAT COMMENTING IS NOT AVAILABLE
808

YES

CURRENT TIME ASSOCIATED WITH A COMMENTING PERIOD?
810

NO

YES

CAUSE PRESENTATION, VIA THE VIRTUAL SPACE, OF AN INPUT INTERFACE ASSOCIATED WITH THE SECTION
812

RECEIVE, VIA THE INPUT INTERFACE, THE USER INPUT ASSOCIATED WITH THE SECTION OF THE MEETING TRANSCRIPT
814

STORE THE USER INPUT AS METADATA ASSOCIATED WITH AN AUDIO MEETING FILE OR A VIDEO MEETING FILE OF THE MEETING
816

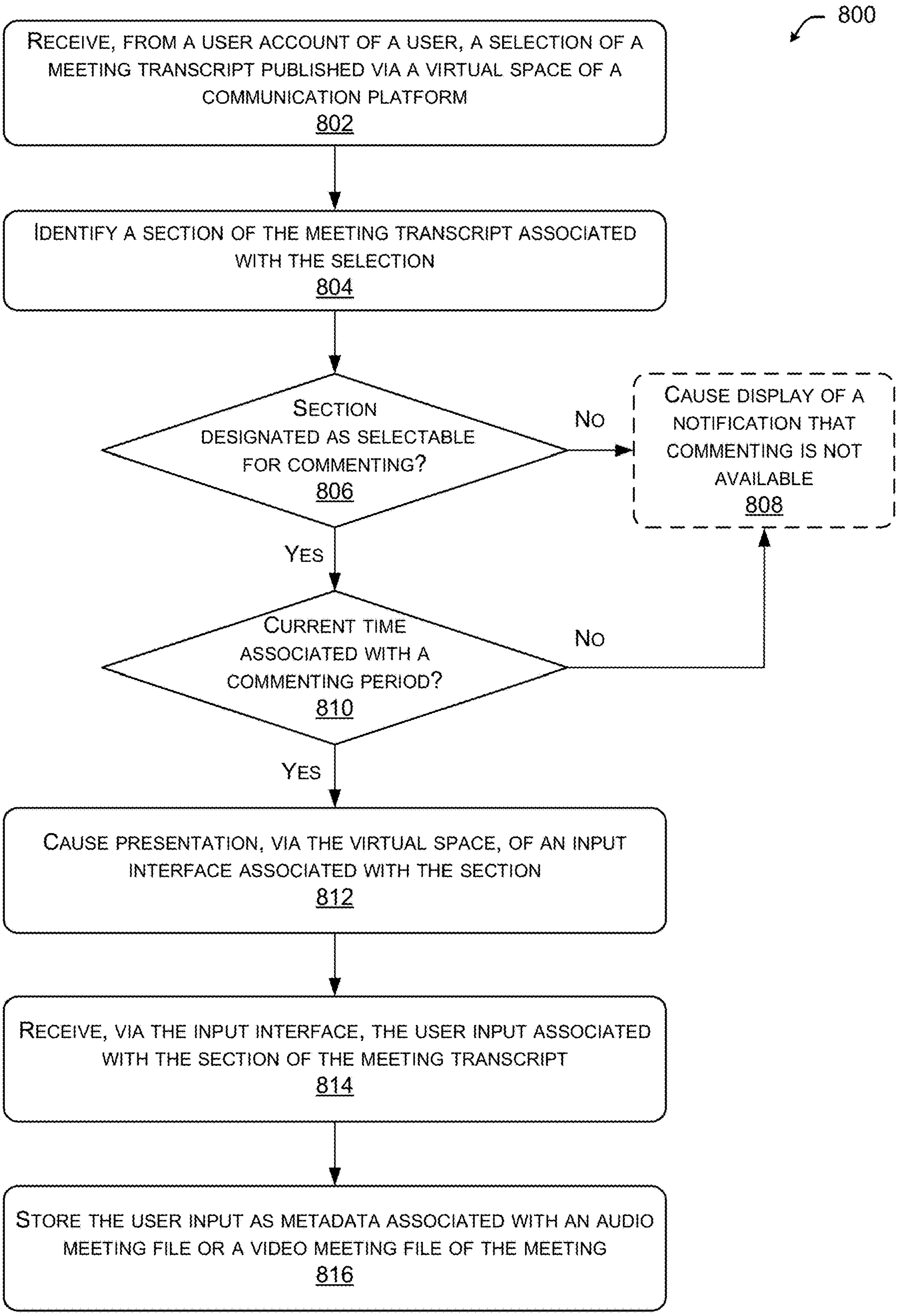

FIG. 8

COMMUNICATION PLATFORM INTERACTIVE TRANSCRIPTS

TECHNICAL FIELD

Communication platforms are becoming increasingly more popular for facilitating work-related communications, such as for project collaboration within a single organization and across two or more organizations. To facilitate project collaboration, users often conduct meetings, such as audio or video meetings, to synchronize, divide up work, provide status updates, and the like. Oftentimes, meeting attendees can take notes of the information disseminated during a meeting, such as to follow up on action items, add tasks to a to do list, and/or the like. However, notes can often be incomplete, as meeting attendees struggle to type or write as fast as another person speaks. Additionally, while focusing on typing or writing notes, a meeting attendee may miss information presented during the meeting. In some instances, meeting attendees may record the meeting, to later listen or watch the recording and review meeting details. However, this process can be time consuming and inefficient to identify relevant information to a particular attendee. Further, for recordings presented to other users who were unable to attend the original meeting, the other users would be required to listen to the entire recording to identify relevant sections of the meeting that are applicable to them. Finally, while the recording may be effective to transmit information to the other users who were unable to attend, the transmission is one way, thereby limiting an amount of collaboration made possible with the meeting.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

FIGS. 6A-6C illustrate example user interfaces for rendering portions of a transcript of a meeting selectable for commenting and presenting a failure notification in response to receiving a selection of a portion that is not rendered selectable for commenting, as described herein.

FIG. 8 is an example process for modifying a file associated with a meeting based on user input received via a meeting transcript, as described herein.

DETAILED DESCRIPTION

Figure 1:
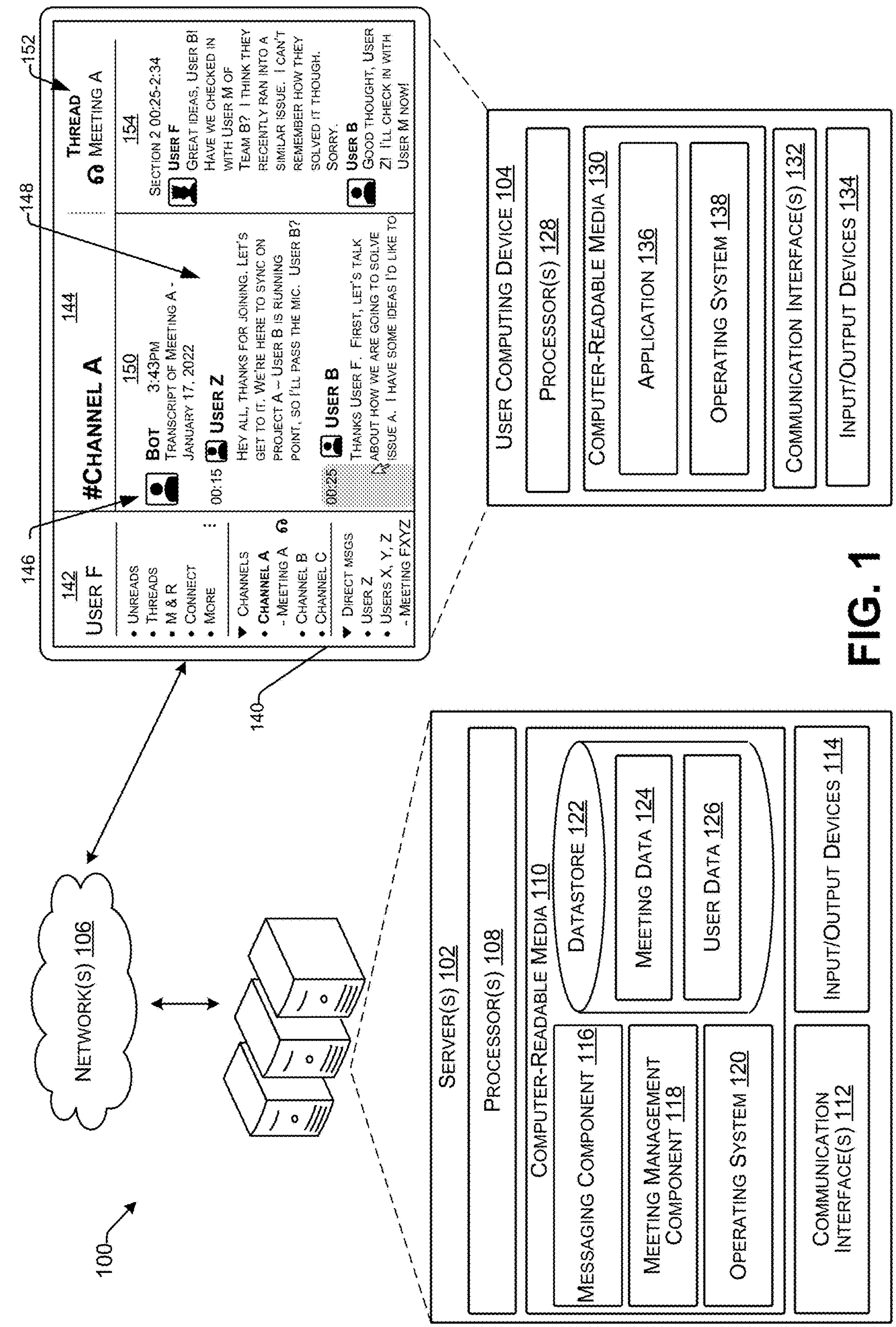
FIG. 1 illustrates an example system for performing techniques described herein.

Techniques for providing an interactable meeting transcript associated with an audio or video meeting via a virtual space of a communication platform are described herein. The communication platform can be a group-based communication platform, a channel-based messaging platform and/or any other platform for facilitating communication between and among users. In an example, one or more users (collectively meeting attendees) can conduct a meeting (e.g., an audio meeting, video meeting, etc.) via the communication platform. The communication platform can receive data representative of the meeting from user account(s) associated with the meeting attendee(s). The communication platform can publish a transcript of the meeting via a virtual space (e.g., communication channel, direct messaging instance, collaborative document, etc.). In at least one example, the communication platform can render one or more sections of the transcript selectable for commenting. In response to receiving a selection of a first section of the one or more sections by a user associated with the virtual space, the communication platform can cause an input interface to be presented, enabling the user to comment on the first section of the transcript, such as in a thread associated with the first section.

As discussed above, audio and video meetings have become common methods for collaboration and information dissemination among co-workers, teammates, service providers (e.g., salespeople) and customers, to name a few. During the meeting, individual attendees can take notes, such as to assist in later recalling details of the meeting. However, the notes are often inadequate to capture all that was discussed during the meeting. Additionally, while writing or typing notes, a meeting attendee may miss portions of information shared during the meeting. To prevent this issue, a meeting attendee (e.g., host or other attendee) may record the meeting. A recording may additionally enable other users who were unable to join the meeting, to listen to the contents therein. The recording may be effective to transmit information to others, for an initial view or to review the contents therein, but the review of a recording can be time consuming and static. That is, users reviewing the recording can listen, but cannot participate in, or provide input associated with a topic of, the meeting. As such, the effectiveness of the meeting as a means for collaboration can be limited based on a number of attendees available to attend, and the ideas that those meeting attendees can evoke during the meeting.

Techniques described herein are directed to providing an interactable meeting transcript to, among other things, improve the extent of collaboration associated with meetings. In at least one example, a first user can submit a request to generate a meeting instance (e.g., instance of a meeting) with at least one other user. The request can include a request to generate an audio meeting instance (e.g., Voice over Internet Protocol (VoIP)) or a video meeting instance. In some examples, the first user can submit the request in association with a virtual space (e.g., workspace, communication channel, direct message instance, collaborative document, etc.). That is, the first user can request to generate the meeting instance within the virtual space, such that one or more other available members of the virtual space can attend. In some examples, the first user can select desired attendees, such as from a list of members of the virtual space. In some examples, the list provided can include members of the virtual space that are currently online and/or active in the communication platform and thus available for the meeting. In some examples, the first user can request to generate the meeting independent of a virtual space. In such examples, the first user can select one or more other users of the communication platform to invite to the meeting.

In response to the request to generate the meeting, the communication platform can generate the audio or video meeting and can provide meeting interfaces via individual clients (e.g., an instance of a communication application, a computing device, etc.) associated with the meeting attendees. In at least one example, the communication platform can receive, from the clients, data representative of the meeting. That is, the communication platform can receive first data from a first client associated with a first user, second data from a second client associated with a second user, and so on. In at least one example, the communication platform can store the data representative of the meeting in a database, such as in an audio meeting file or a video meeting file.

In at least one example, the communication platform can be configured to generate a transcript associated with the data. The transcript can include a textual representation of the data. In at least one example, the communication platform can use known speech recognition techniques to generate the transcript. In some examples, the communication platform can generate the transcript concurrently or substantially concurrently with the meeting. That is, the communication platform can be configured to generate a textual representation of the meeting while it is being conducted. In some examples, the communication platform can generate the transcript after receiving an indication that the meeting is complete. The indication that the meeting is complete can include an indication that a host or administrator of the meeting has stopped the meeting, that a threshold number of meeting attendees have closed associated meeting interfaces, and/or the like. That is, the communication platform can identify a completion of the meeting and, based on the completion, can generate the transcript associated therewith.

In at least one example, the transcript can include timestamps associated with each user input (e.g., the first data, the second data, etc.) provided during the meeting. For example, the first data can include a first statement by the first user at a first timestamp (e.g., beginning of the statement), the second data can include a second statement by the second user at a second timestamp, and so on. In some examples, the timestamps can be associated with breaks in a conversation. That is, the communication platform can be configured to identify a period in which no input is received (e.g., no comments from attendees), and can associate a timestamp with a next user input (e.g., next comment). For example, the first data can include a first statement by the first user at a first timestamp. The communication platform can then determine that the first user pauses for a threshold amount of time (e.g., 0.7 seconds, 1 second, 2 seconds, etc.). The communication platform can then receive second data from the first user and can associate a second timestamp with the second data.

In various examples, the communication platform can be configured to generate a new timestamp based on an express user input from a user, such as in response to receiving input including a keyword or other trigger. That is, a meeting attendee can provide an indication to the communication platform, to associate another timestamp with a subsequent input, such as to cause the previous user input to be separately selectable in the transcript. For example, a user can say "break," "next section," "new idea" or the like, to cause the communication platform to associate a timestamp with a subsequent input. In at least one example, the communication platform can generate the transcript in a chronological order, based on the timestamps, such that the transcript represents the statements made in an ordered presentation.

In some examples, the communication platform can be configured to identify individual sections associated with the transcript. In at least one example, the sections can be associated with the timestamps. That is, the sections can be defined by individual inputs from meeting attendees, breaks in the conversation, an express input of a keyword or other trigger, and/or the like, as described above with respect to the timestamps. In some examples, the sections can be associated with predefined intervals (e.g., 15 seconds, 30 seconds, 1 minute, etc.). In at least one example, the communication platform can generate the transcript with section indicators associated with respective sections, such as to provide an indication of section differentiation.

In some examples, the communication platform can cause presentation of a notification to an administrator or host of the meeting that the transcript is available for publication. In some examples, the notification can be presented in association with an indicator or label associated with the meeting that is presented via a user interface associated with the administrator or host. In some examples, the notification can be a pop-up or overlay notification. In some examples, the notification can be provided in an automated message, such as that presented via a direct messaging instance, via the virtual space associated with the meeting, and/or the like. In examples in which the meeting is associated with a virtual space, the automated message can be presented via the associated virtual space. In some examples, the notification can include a selectable option to share the transcript with one or more other users, such as via the associated virtual space and/or another virtual space of the communication platform.

In at least one example, based on a determination that the meeting is associated with a virtual space (e.g., meeting created via the virtual space) and/or in response to a selection of the selectable option to share the transcript, the communication platform can publish the transcript of the meeting via the virtual space (e.g., associated virtual space, virtual space associated with the share, etc.). That is, the communication platform can cause the transcript to be presented via the virtual space. In at least one example, the transcript can be presented as an automated message, generated by the communication platform. In some examples, the transcript can be presented as a message from a user account associated with the administrator or host of the meeting.

In at least one example, the communication platform can render one or more sections of the transcript presented as the message selectable, such that each section can represent a root message for thread generation. That is, a viewing user can select a section of the transcript and can generate a messaging thread associated therewith, such as to provide input or comment on the section. In some examples, the communication platform can identify the one or more sections of the transcript to render selectable based on a default setting associated with meetings conducted via the communication platform. In some examples, the default setting can be associated with a user account associated with the administrator or host of the meeting, an organization preference associated with an organization hosting the meeting, and/or the communication platform itself. For example, a default setting can include a setting to render all sections of a published transcript selectable for commenting. For another example, the default setting, such as based on a user or organization preference, can include a setting to render sections associated with the host and/or other identified personnel selectable for commenting.

In some examples, the communication platform can be configured to identify the one or more sections to render selectable based on user input, such as from the administrator or host of the meeting. In some examples, the user input can be provided in association with the transcript of the meeting. That is, the user input can include individual selections to render a section either selectable for commenting, or not selectable. In some examples, the user input can be provided independent of the transcript, such as via a meeting details management interface. In some examples, the administrator or host can provide data associated with portions of the meeting to render selectable. For example, the meeting can include an introduction and breakout sessions. The user input can include an instruction to render the breakout sessions, but not the introduction, selectable for commenting. In some examples, the administrator or host can provide user identifiers (e.g., username, real name, etc.) associated with meeting attendees and/or a selection of individual meeting attendees, to cause sections associated with comments or input therefrom to be rendered selectable.

In some examples, the communication platform can render the one or more sections selectable for commenting for a period of time. In some examples, the period of time can be determined by the communication platform, such as a predetermined time period for commenting (e.g., 1 week, 1 month, etc.). In some examples, the period of time can be determined based on user input from the administrator or host of the meeting or organization, such as based on a user or organization preference. In some examples, the user input can be associated with a particular meeting. In such examples, the user input can designate a particular period of time for commenting on one or more sections of the particular meeting. In response to receiving the user input designating the period of time, the communication platform can cause the section(s) of the transcript (published via a virtual space) to be selectable for the period of time. After the period of time, the communication platform can render the section(s) of the transcript published via the virtual space unavailable for commenting (e.g., not selectable).

In various examples, a user viewing a transcript published via a virtual space can select a section of the transcript. In response to the selection, the communication platform can identify whether the section is rendered selectable for commenting. Based on a determination that the section is not rendered selectable for commenting, the communication platform can cause a notification that commenting is not available in association with the selected section. Based on a determination that the section is rendered selectable for commenting, the communication platform can cause an input interface to be presented in association with the transcript. In at least one example, the input interface can include a thread messaging interface that is configured to receive user input as a message to be published via a thread associated with the selected section. The user input can be provided in text, audio, and/or video. That is, the message associated with the messaging thread can include an audio message, a video message, or a message in a text format.

In some examples, users viewing the transcript and/or messaging thread can view or listen to the message (e.g., user input) and can publish additional messages (e.g., user inputs, comments, etc.) associated with the section and/or the message. For example, the first user can select a first section of the transcript presented in association with a virtual space, and can publish a first message in a messaging thread associated with the first section at a first time. A second user can, at a second time after the first time, select the first message to access the messaging thread, view the first message, and react to the first message and/or publish a second message in the messaging thread, such as to comment on the first message and/or the first section. Subsequent users viewing the messaging thread can view, comment on, or react to the first message and the second message.

In various examples, the communication platform can store the user inputs in association with the meeting file. In at least one example, the communication platform can modify the meeting file to include the user input (e.g., message provided in the messaging thread) in association with the selected section. That is, the communication platform can modify the meeting file to include the selected section, and one or more comments thereto provided via the messaging thread. In at least one example, the communication platform can modify a format of the message to match the original meeting file. For example, if the original meeting file included an audio meeting file, and a message in a messaging thread included text, the communication platform can convert the message in text to an audio format, to include in the modified audio meeting file. In examples in which the original meeting file includes a video meeting file, and a message provided in a messaging thread includes text or audio, the communication platform can cause presentation of an avatar or other image of the user associated with the message (e.g., user who provided the user input).

In at least one example, the communication platform can modify the meeting file to associate a message provided via a messaging thread with a selected section. That is, the communication platform can modify the meeting file to include the first section, followed by the contents of the message, followed by a second section (e.g., section of the transcript that directly follows the first section, consecutive sections of the meeting). In examples in which the messaging thread includes two or more messages, the communication platform can include the two or more messages associated with the first section in the modified audio file, in chronological order based on associated timestamps, prior to the second (next) section. As such, the communication platform can be configured to modify the meeting file to include user inputs received after the meeting with respective sections, such that the user inputs included in the modified meeting file are contextually relevant and provided in an order in which they were received (e.g., respective users submitted messages in the thread).

In various examples, the communication platform can render the modified meeting file available for access by a user of the communication platform. In some examples, the communication platform can limit access to the modified meeting file based on user permissions. In some examples, the communication platform can associate user permissions to view the modified meeting file with the administrator or host of the meeting, meeting attendees, and/or members of the virtual space associated with the meeting or via which the transcript thereof is shared. In some examples, the administrator or host of the meeting can associate user permissions to view the modified meeting file with select users. That is, the administrator or host can designate the select users as being eligible to view and/or listen to the modified meeting file.

Additionally, the communication platform can be configured to increase a potential for collaboration associated with a meeting by providing a polling interface for a poll (e.g., survey, etc.) in association with a transcript of the meeting. In some examples, the administrator or host of the meeting can associate the poll therewith, such as to elicit additional feedback from viewers in association with the transcript. For example, the administrator or host can send an instruction to the communication platform to generate a poll to associate with the transcript published via the virtual space. In such examples, the instruction can include poll characteristics, such as question(s) to be included in the poll, topic(s) to be associated with an input box in which other users can submit their input, a period of time to render the poll available for input, and/or the like. In some examples, the poll characteristics can include input anonymity, such as to render some or all of the feedback submitted via the poll anonymous or to provide an option to enable a viewing user to select in order to render one or more portions of submitted input anonymous.

In some examples, the communication platform can be configured to generate a poll based on content of the meeting. That is, the communication platform can analyze the content of the meeting (e.g., data representative thereof) to identify a potential poll (e.g., polling characteristics of a poll), such as utilizing natural language processing techniques, machine learning techniques, and/or the like. In some examples, in response to identifying the potential poll, the communication platform can generate a polling interface associated with the poll, to associate with the transcript. In at least one example, the communication platform can cause presentation of an affordance associated with the polling interface to be presented via the virtual space in association with the transcript.

In some examples, in response to identifying the potential poll, the communication platform can send a request for confirmation to the administrator or host of the meeting, such as to receive an explicit confirmation to associate the polling interface with the transcript. In some examples, the request for confirmation can include an interface to enable the administrator or host to modify characteristics associated with the platform-generated polling interface. In response to receiving confirmation and/or modified characteristics, the communication platform can cause presentation of the affordance associated with the polling interface via the virtual space in association with the transcript of the meeting.

In various examples, the communication platform can be configured to receive user input via instances of the polling interface and store results of the poll in association with the meeting file. In some examples, the communication platform can be configured to send the user input and/or results of the poll to the administrator or host of the meeting. In some examples, the communication platform can provide the administrator or host with a link to access the results, such as in an automated message directed to the administrator or host. In some examples, the communication platform can be configured to publish the results (e.g., aggregated results) of the poll via the virtual space, such as in association with the transcript. In some examples, the communication platform can include a link to the results (e.g., aggregated results and/or individually submitted inputs) in association with the transcript.

From the user experience perspective, techniques described herein greatly enhance the ability for a user to review meeting contents and the potential for collaboration in association with a meeting. As discussed above, conventional techniques for reviewing information discussed and/or disseminated during a meeting include reviewing notes taken during the meeting and/or listening to a recording thereof. However, both options currently available to review meeting contents are inadequate from a user perspective, as notes are often incomplete, and recordings can require a significant amount of time to review. Unlike these conventional methods, the techniques described herein provide users with an automatically generated transcript of a meeting that is published via a virtual space associated with the meeting. That is, meeting attendees or other users who were unable to attend can efficiently access contents of the meeting, and quickly review information discussed and/or disseminated. Further, the techniques described herein render sections of the published transcript available for commenting. That is, the communication platform can render the sections selectable such that a viewing user can comment, submit ideas, and further collaborate on issues discussed during the meeting. Not only can this enable meeting attendees to provide additional feedback associated with the meeting, but it can also enable other users who were unable to attend the meeting to participate, thereby greatly enhancing the potential for collaboration associated with the meeting.

Additionally, the techniques described herein can improve the functioning of user computing devices. As discussed above, previously to review meeting content, a user could play a recording of the meeting. At times, to adequately process the information contained in the recording, the user may be required to stop the recording, rewind, and replay sections of the meeting. Depending on the topic and complexity of the conversation, the reviewing user may be required to replay sections many times before fully grasping the contents therein. In contrast, techniques described herein provide a written transcript of the meeting contents, thereby enabling the reviewing user to pause on the section, read, and re-read if necessary. This review of the transcript requires fewer computing resources than the conventional techniques which can include replaying sections of the meeting multiple times. As such, the techniques described herein can improve the functioning of the user computing device by rendering available additional computing resources for other functions.

Further, utilizing traditional techniques, users would often be required to schedule follow-on meetings to discuss particular topics brought up in an initial meeting. Oftentimes, these follow-on meetings are conducted via video or audio (VoIP) calls, potentially utilizing significant computing resources and network bandwidth. In contrast, the techniques described herein provide an interactable transcript associated with a meeting that is configured to enable users to continue to discuss topics introduced during the meeting. Thereby negating the need for the follow-on meetings, and saving processing power on the user computing device. Additionally, by avoiding the additional follow-on meetings, the techniques described herein can increase an amount of network bandwidth that is available for other functions and/or computing devices. Additional details and examples are described below with reference to FIGS. 1-11.

FIG. 1 illustrates an example system 100 for performing techniques described herein. In at least one example, the example system 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifiers, which can be associated with common access credentials, domains, or the like. In some examples, the communication platform can be a hub, offering a secure and private virtual space to enable users to chat, meet, call, collaborate, transfer files or other data, or otherwise communicate between or among each other. In various examples, each group can be associated with a workspace, enabling users associated with the group to chat, meet, call, collaborate, transfer files or other data, or otherwise communicate between or among each other in a secure and private virtual space. In some examples, members of a group, and thus a workspace, can be associated with a same organization. In some examples, members of a group, and thus a workspace, can be associated with different organizations (e.g., entities with different organization identifiers).

In at least one example, the example system 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 and/or one or more other computing devices (e.g., third-party computing devices associated with a third-party resource) via one or more network(s) 106. That is, the server(s) 102, the user computing device 104, and the other-party computing device(s) can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example system 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114. In at least one example, each processor of the processor(s) 108 can be a single processing unit or multiple processing units and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a messaging component 116, a meeting management component 118, an operating system 120, and a datastore 122.

In at least one example, the messaging component 116 can process messages between users. That is, in at least one example, the messaging component 116 can receive an outgoing message from a user computing device 104 and can send the message as an incoming message to a second user computing device 104. The messages can include direct messages sent from an originating user to one or more specified users and/or communication channel messages sent via a communication channel from the originating user to the one or more users associated with the communication channel. Additionally, the messages can be transmitted in association with a collaborative document, such as in a chat interface associated therewith. In at least one example, the messaging component 116 can receive, from a user account (e.g., associated user computing device), a message associated with a messaging thread.

In at least one example, the messaging component 116 can store the message in association with a root message of the messaging thread. That is, the messaging component 116 can associate the message with another message originally transmitted via a virtual space. In some examples, the messaging component 116 can identify a section of a meeting transcript as a root of the message input via a messaging thread. In such examples, the messaging component 116 can store the data associated with the message in association with the meeting transcript and/or the section thereof. In some examples, the meeting component 116 can provide data associated with the message to the meeting management component 118, such as for further processing.

In some examples, the meeting management component 118 can be configured to generate audio and/or video meeting instances (e.g., meetings) via the communication platform, and manage data associated therewith. In at least one example, the meeting management component 118 generates a meeting in response to receiving a request from a user of the communication platform to initiate the meeting. In some examples, the user can submit the request in association with a virtual space (e.g., workspace, communication channel, direct message instance, collaborative document, etc.). In such examples, in response to receiving the request, the meeting management component can generate the meeting instance in association with the virtual space, such that one or more other available members of the virtual space can attend. In some examples, the user can select desired attendees, such as from a list of members of the virtual space. In some examples, the meeting management component 118 can provide the list of members, including members of the virtual space that are currently online and/or active in the communication platform and thus available for the meeting. In some examples, the user can request to generate the meeting independent of a virtual space. In such examples, the meeting management component 118 can receive the request from the user account of the user, the request including an indication of one or more other users of the communication platform to invite to the meeting.

In response to the request to generate the meeting, the meeting management component 118 can generate the audio or video meeting and can provide meeting interfaces via individual user computing device 104 associated with the meeting attendees. In at least one example, the meeting management component 118 can receive, from the user computing devices 104, data representative of the meeting (e.g., audio data, video data, text data, etc.). That is, the meeting management component 118 can receive first data from a first user computing device 104 associated with a first user, second data from a second user computing device 104 associated with a second user, and so on. In at least one example, the meeting management component 118 can store the data representative of the meeting in the datastore 122, such as in an audio meeting file or a video meeting file stored in meeting data 124.

In at least one example, the meeting management component 118 can be configured to generate a transcript associated with the data. The transcript can include a textual representation of the data, copies or link(s) to documents or files referenced in the meeting, and the like. In at least one example, the meeting management component 118 can use speech recognition techniques to generate the transcript. In some examples, the meeting management component 118 can include a speech-to-text program that incorporates artificial intelligence and/or machine learning techniques to identify content of (e.g., words spoken in) a meeting. In at least one example, the meeting management component 118 can be configured to identify a user identifier of a user associated with a portion of content (e.g., user input, statement, information, etc.), and can include the user identifier in the transcript associated with the portion of content. That is, the meeting management component 118 can be configured to generate a transcript that includes an identifier associated with a user who provided a respective portion of content.

In some examples, the meeting management component 118 can generate the transcript concurrently or substantially concurrently with the meeting. That is, the meeting management component 118 can be configured to generate a textual representation of the meeting while it is being conducted. In some examples, the meeting management component 118 can generate the transcript in response to receiving an indication that the meeting is complete. Non-limiting examples of the indication that the meeting is complete can include an indication that a host or administrator of the meeting has stopped the meeting, that a threshold number of meeting attendees have closed associated meeting interfaces, no data associated with the meeting is received for a threshold amount of time (e.g., 3 minutes, 5 minutes, etc.), and/or the like. That is, the meeting management component 118 can identify a completion of the meeting and, based on the completion, can generate the transcript associated therewith.

In at least one example, the transcript can include timestamps associated with each user input (e.g., portion of content, etc.) provided during the meeting. For example, the first data can include a first statement by a first user at a first timestamp (e.g., beginning of the statement), the second data can include a second statement by the second user at a second timestamp, and so on. In some examples, the timestamps can be associated with breaks in a conversation. That is, the meeting management component 118 can be configured to identify a period in which no input is received (e.g., no comments from attendees), and can associate a timestamp with a next user input (e.g., next comment or portion of content received). For example, the first data can include a first statement by the first user at a first timestamp. The meeting management component 118 can then determine that the first user pauses for a threshold amount of time (e.g., 0.7 seconds, 1 second, 2 seconds, etc.), after which the meeting management component 118 receives second data from the first user and associates a second timestamp with the second data.

In various examples, the meeting management component 118 can be configured to generate a new timestamp based on an express user input from a user, such as in response to receiving input including a keyword or other trigger. That is, a meeting attendee can provide an indication to the meeting management component 118, to associate another timestamp, such as to cause the previous user input to be separately selectable in the transcript. For example, a user can say "break," "next section," "new idea" or the like, to cause the meeting management component 118 to associate a timestamp with a subsequent input. In at least one example, the meeting management component 118 can generate the transcript in a chronological order, based on the timestamps, such that the transcript represents the statements made in an ordered presentation.

In some examples, the meeting management component 118 can be configured to identify individual sections associated with the transcript. In at least one example, the sections can be associated with the timestamps. That is, the sections can be defined by individual inputs from meeting attendees, breaks in the conversation, an express input of a keyword or other trigger, and/or the like, as described above with respect to the timestamps. Continuing the example from above, the first data associated with a first timestamp can represent a first section and the second data associated with a second timestamp can represent a second section. In some examples, the sections can be associated with predefined intervals (e.g., 15 seconds, 30 seconds, 1 minute, etc.). For example, a first section of a transcript can include a first time interval from 0 seconds to 25 seconds and a second section of the transcript can include a second interval from 26 seconds to 50 seconds.

In at least one example, the meeting management component 118 can generate the transcript with section indicators associated with respective sections, such as to provide an indication of different sections. In some examples, the section indicators can include an indication of a respective section number, such as that presented in a chronological order. For example, a first section of a transcript can include a "1" as a section indicator that indicates that it is an initial section of the transcript, a second section can include a "2," and so on. In some examples, the section indicators can include indications of timestamps associated with respective sections. In such examples, the meeting management component 118 can be configured to identify timestamps associated with each section, such as a start timestamp and/or a stop timestamp associated with each section. In at least one example, the section indicator can include the start timestamp of the associated section. In some examples, the section indicator can include the range of times of the associated section (e.g., the start timestamp and the end timestamp. For example, the section indicator can include a range from 00:25-00:33.

In some examples, in response to generating a transcript associated with a meeting, the meeting management component 118 can cause presentation of a notification to an administrator or host of the meeting that the transcript is available for publication. In some examples, the notification can be presented in association with an indicator or label associated with the meeting that is presented via a user interface associated with the administrator or host. In some examples, the notification can be a pop-up or overlay notification. In some examples, the notification can be provided in an automated message, such as that presented via a direct messaging instance, an administrative communication channel, the virtual space associated with the meeting, and/or the like. In some examples, the notification can include a selectable option to share the transcript with one or more other users, such as via the associated virtual space and/or another virtual space of the communication platform.

In at least one example, based on a determination that the meeting is associated with a virtual space (e.g., meeting created via the virtual space) and/or in response to a selection of the selectable option to share the transcript, the meeting management component 118 can publish the transcript of the meeting via the virtual space (e.g., associated virtual space, virtual space associated with the share, etc.). That is, the meeting management component 118 can cause the transcript to be presented via the virtual space. In at least one example, the transcript can be presented as an automated message, generated by the meeting management component 118. In some examples, the transcript can be presented as a message from a user account associated with the administrator or host of the meeting.

In at least one example, the meeting management component 118 can render one or more sections of the transcript presented as the message selectable, such that each section can represent a root message for thread generation. That is, a viewing user can select a section of the transcript and can generate a messaging thread associated therewith, such as to provide input or comment on the section. In some examples, the meeting management component 118 can identify the one or more sections of the transcript to render selectable based on a default setting associated with meetings conducted via the communication platform. In some examples, the default setting can be associated with a user account associated with the administrator or host of the meeting, an organization preference associated with an organization hosting the meeting, and/or the communication platform itself. For example, a default setting can include a setting to render all sections of a published transcript selectable for commenting. For another example, the default setting, such as based on a user or organization preference, can include a setting to render sections associated with the host and/or other identified personnel selectable for commenting.

In some examples, the meeting management component 118 can be configured to identify the one or more sections to render selectable based on user input, such as from the administrator or host of the meeting. In some examples, the user input can be provided in association with the transcript of the meeting. That is, the user input can include individual selections to render a section either selectable for commenting, or not selectable. In some examples, the user input can be provided independent of the transcript, such as via a meeting details management interface. In some examples, the administrator or host can provide data associated with portions of the meeting to render selectable. For example, the meeting can include an introduction and breakout sessions. The user input can include an instruction to render the breakout sessions, but not the introduction, selectable for commenting. In some examples, the administrator or host can provide user identifiers (e.g., username, real name, etc.) associated with meeting attendees and/or a selection of individual meeting attendees, to cause sections associated with comments or input therefrom to be rendered selectable.

In some examples, the meeting management component 118 can identify a period of time (e.g., indefinite time period, 1 day, 1 week, 2 weeks, etc.) associated with commenting on a transcript or sections thereof. In such examples, the meeting management component 118 can render the one or more sections selectable for commenting for the period of time. In some examples, the period of time can be determined by the meeting management component 118, such as a predetermined time period for commenting (e.g., 1 week, 1 month, etc.). In some examples, the period of time can be determined based on user input from the administrator or host of the meeting (e.g., user preference, etc.), an administrator of an organization (e.g., organization preference). In some examples, the user input can be associated with a particular meeting. In such examples, the user input can designate a particular period of time for commenting on one or more sections of the transcript associated with the particular meeting. In response to receiving the user input designating the period of time, the meeting management component 118 can cause the section(s) of the transcript (published via a virtual space) to be selectable for the period of time. After the period of time, the meeting management component 118 can render the section(s) of the transcript published via the virtual space unavailable for commenting (e.g., not selectable).

As discussed above, in at least one example, the meeting management component 118 can render at least one section of a meeting transcript published via a virtual space selectable for commenting. That is, a user viewing the transcript via the virtual space can select a section of the transcript and, in response to the selection, the meeting management component 118 can identify whether the section is rendered selectable for commenting. Based on a determination that the section is not rendered selectable for commenting, the meeting management component 118 can cause a notification that commenting is not available in association with the selected section. Based on a determination that the section is rendered selectable for commenting, the meeting management component 118 can cause an input interface to be presented in association with the transcript. In at least one example, the input interface can include a thread messaging interface that is configured to receive user input as a message to be published via a thread associated with the selected section. The user input can be provided in text, audio, and/or video. That is, the message associated with the messaging thread can include an audio message, a video message, or a message in a text format.

In some examples, users viewing the transcript and/or messaging thread can view, listen to, or watch the message (e.g., user input) and can publish additional messages (e.g., user inputs, comments, etc.) associated with the section and/or the message. For example, the first user can select a first section of the transcript presented in association with a virtual space, and can transmit a first message in a messaging thread associated with the first section at a first time. A second user can, at a second time after the first time, select the first message to access the messaging thread, view the first message, and react to the first message and/or publish a second message in the messaging thread, such as to comment on the first message and/or the first section. Subsequent users viewing the messaging thread can view, comment on, or react to the first message and the second message.

In various examples, the meeting management component 118 can store the user inputs in association with the meeting file, such as in association with the meeting data 124 of the datastore 122. In at least one example, the meeting management component 118 can modify the meeting file to include the user input (e.g., message provided in the messaging thread) in association with the selected section. That is, the meeting management component 118 can modify the meeting file to include the selected section, and one or more comments thereto provided via the messaging thread. In at least one example, the meeting management component 118 can modify a format of the message to match the original meeting file. For example, if the original meeting file included an audio meeting file, and a message in a messaging thread included text, the communication platform can convert the message in text to an audio format, to include in the modified audio meeting file. In examples in which the original meeting file includes a video meeting file, and a message provided in a messaging thread includes text or audio, the communication platform can cause presentation of an avatar or other image of the user associated with the message (e.g., user who provided the user input).

In at least one example, the meeting management component 118 can modify the meeting file to associate a message provided via a messaging thread with a selected section. That is, the meeting management component 118 can modify the meeting file to include the first section, followed by the contents of the message, followed by a second section (e.g., section of the transcript that directly follows the first section, consecutive sections of the meeting). In examples in which the messaging thread includes two or more messages, the meeting management component 118 can include the two or more messages associated with the first section in the modified audio file, in chronological order based on associated timestamps, prior to the second (next) section. As such, the meeting management component 118 can be configured to modify the meeting file to include user inputs received after the meeting with respective sections, such that the user inputs included in the modified meeting file are contextually relevant and provided in an order in which they were received (e.g., respective users submitted messages in the thread).

In various examples, the meeting management component 118 can render the modified meeting file available for access by a user of the communication platform. In some examples, the meeting management component 118 can limit access to the modified meeting file based on user permissions. In some examples, the meeting management component 118 can associate user permissions to view the modified meeting file with the administrator or host of the meeting, meeting attendees, and/or members of the virtual space associated with the meeting or via which the transcript thereof is shared. In some examples, the administrator or host of the meeting can associate user permissions to view the modified meeting file with select users. That is, the administrator or host can designate the select users as being eligible to view, listen to, and/or watch the modified meeting file.

Additionally, in some examples, the meeting management component 118 can further increase a potential for collaboration associated with a meeting by providing a polling interface for a poll (e.g., survey, etc.) in association with a transcript of the meeting, such as that published via the virtual space. In some examples, the administrator or host of the meeting can associate the poll therewith, such as to elicit additional feedback from viewers in association with the transcript. For example, the administrator or host can send an instruction to the meeting management component 118 to generate a poll to associate with the transcript published via the virtual space. In such examples, the instruction can include poll characteristics, such as question(s) to be included in the poll, topic(s) to be associated with an input box in which other users can submit their input, a period of time to render the poll available for input, and/or the like. In some examples, the poll characteristics can include input anonymity, such as to render some or all of the feedback submitted via the poll anonymous or to provide an option to enable a viewing user to select in order to render one or more portions of submitted input anonymous.

In some examples, the meeting management component 118 can be configured to generate a poll based on content of the meeting. That is, the meeting management component 118 can be configured to analyze the content of the meeting (e.g., data representative thereof) to identify a potential poll, such as utilizing natural language processing techniques, machine learning techniques, and/or the like. In some examples, in response to identifying the potential poll, the meeting management component 118 can generate a polling interface associated with the poll, to associate with the transcript. In at least one example, the meeting management component 118 can cause presentation of an affordance associated with the polling interface to be presented via the virtual space in association with the transcript.

In some examples, in response to identifying the potential poll based on the contents of the meeting, the meeting management component 118 can send a request for confirmation to the administrator or host of the meeting, such as to receive an explicit confirmation to associate the polling interface with the transcript. In some examples, the request for confirmation can include an interface to enable the administrator or host to modify characteristics associated with the platform-generated polling interface. In response to receiving confirmation and/or modified characteristics, the meeting management component 118 can cause presentation of the affordance associated with the polling interface via the virtual space in association with the transcript of the meeting.

In various examples, the meeting management component 118 can be configured to receive user input via instances of the polling interface and store results of the poll (e.g., poll results) in the datastore 122. In at least one example, the meeting management component 118 can store the poll results in association with the meeting file, such as in the meeting data 124. In some examples, the meeting management component 118 can be configured to aggregate the poll results. In some examples, the meeting management component 118 can store the user inputs as aggregated results and/or as individual user inputs (e.g., individual responses to the poll).

In some examples, the meeting management component 118 can be configured to send the user inputs and/or aggregated results to the administrator or host of the meeting. In some examples, the meeting management component 118 can provide the administrator or host with a link to access the results, such as in an automated message directed to the administrator or host. In some examples, the meeting management component 118 can be configured to publish the results (e.g., aggregated results) of the poll via the virtual space, such as in association with the transcript. In some examples, the meeting management component 118 can include a link to the results, aggregated and/or individually submitted inputs), in association with the transcript.

In at least one example, the meeting management component 118 can determine whether all or a portion of an individual response to a poll (e.g., individual user input) was submitted anonymously. In response to determining that all or a portion of the individual response was submitted anonymously, the meeting management component 118 can withhold data associated with the identity of the submitting user from all or a portion of the user input. In some examples, the meeting management component 118 can store the user identifiers associated with polling results as metadata associated with the poll and/or the polling results, such as in the datastore 122.

In at least one example, the datastore 122 can be configured to store data that is accessible, downloadable, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user computing device(s), such as the user computing device 104. Additional or alternative data can be stored in the datastore 122 and/or in one or more other data stores.

In some examples, the datastore 122 can be partitioned into discrete items of data that can be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, organization data stored in the datastore 122 can include discrete shards for each individual organization, including data related to a particular organization identification. For example, a database shard can store electronic communication data associated with members of a particular organization, which enables members of that particular organization to communicate and exchange data with other members of the same organization in real-time or near-real time. In this example, the organization itself can be the host of the database shard and has control over where and how the related data is stored. In some examples, a database shard can store data related to two or more organizations (e.g., as in a shared channel). In at least one example, at least a portion of a shared collaborative document (e.g., document that includes users of different organizations as members) can be stored in association with a shard corresponding to each organization associated with the shared collaborative document.

In some examples, individual users can be associated with a database shard within the datastore 122 that stores data related to a particular user account. For example, user data 126 associated with a particular user account can be stored in a particular database shard. In some examples, individual meetings can be associated with a database shared within the datastore 122 that stores data related to a particular meeting. For example, meeting data 124 (e.g., meeting file, updated meeting file, etc.) associated with a particular meeting can be stored in a particular database shard.

In at least one example, the operating system 120 can manage the processor(s) 108, computer-readable media 110, and/or hardware, software, etc. of the server(s) 102.

The communication interface(s) 112 can include one or more interfaces and hardware components for enabling communication with various other devices (e.g., the user computing device 104, etc.), such as over the network(s) 106 or directly. In some examples, the communication interface(s) 112 can facilitate communication via Web Sockets, Application Programming Interfaces (APIs) (e.g., using API calls), Hypertext Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 128, computer-readable media 130, one or more communication interfaces 132, and input/output devices 134.

In at least one example, each processor of the processor(s) 128 can be a single processing unit or multiple processing units, and can include single or multiple computing units or multiple processing cores. The processor(s) 128 can comprise any of the types of processors described above with reference to the processor(s) 108 and can be the same as or different from the processor(s) 108.

The computer-readable media 130 can comprise any of the types of computer-readable media 130 described above with reference to the computer-readable media 110 and can be the same as or different than the computer-readable media 110. Functional components stored in the computer-readable media can optionally include one or more applications 136 and an operating system 138.

The application(s) 136 can include a mobile application, a web application, and/or a desktop application. In at least one example, at least one application 136 can be provided by the communication platform or which can be an otherwise dedicated application. In some examples, individual user computing devices associated with the system 100 can have an instance or versioned instance of the application(s) 136, which can be downloaded from an application store, accessible via the Internet, or otherwise executable by the processor(s) 128 to perform operations as described herein. That is, the application(s) 136 can be an access point, enabling the user computing device 104 to interact with the server(s) 102 to access and/or use communication services available via the communication platform. In at least one example, the application(s) 136 can facilitate the exchange of data between and among various other user computing devices, for example via the server(s) 102. In at least one example, the application(s) 136 can present user interfaces, as described herein. In at least one example, a user can interact with the user interfaces via touch input, keyboard input, mouse input, spoken input, or any other type of input. In some examples, user interfaces, as described herein, and/or other operations can be performed via a web browser or other access mechanism.

A non-limiting example of a user interface 140 is shown in FIG. 1. As illustrated in FIG. 1, the user interface 140 can present data associated with the communication platform, such as via a communication platform application 136. As illustrated in FIG. 1, the user interface 140 can present data associated with one or more channels, one or more meetings (e.g., audio or video meetings), one or more threads associated with channels and/or section(s) of a transcript and, in some examples, one or more DM messages. Though not illustrated, the user interface 140 can additionally be configured to present data associated with one or more groups, workspaces, collaborative documents, and the like. In some examples, the user interface 140 can include a first section 142, or pane, that includes indicator(s) (e.g., user interface element(s) or object(s)) representing data associated with channel(s), meeting(s), DM message(s), etc. with which the user (e.g., account of the user) is associated. Additional details associated with the first section 142 and indicator(s) are described below with reference to FIG. 2.

In at least one example, the user interface 140 can include a second section 144, or pane, that can be associated with a data feed (or, "feed") indicating messages posted to and/or actions taken with respect to one or more channels and/or other virtual spaces for facilitating communications (e.g., a virtual space associated with direct message communication(s), a virtual space associated with event(s) and/or action(s), etc.) as described herein. In at least one example, data associated with the second section 144 can be associated with the same or different workspaces. That is, in some examples, the second section 144 can present data associated with the same or different workspaces via an integrated feed. In some examples, the data can be organized and/or is sortable by workspace, time (e.g., when associated data is posted or an associated operation is otherwise performed), type (e.g., of action), channel, DM communication, user, or the like. In some examples, such data can be associated with an indication of which user (e.g., member of the channel) posted the message and/or performed an action. In examples where the second section 144 presents data associated with multiple workspaces, at least some data can be associated with an indication of which workspace the data is associated with. Additional details associated with the user interface 140, and the second section 144, are described below with reference to FIG. 2.

In FIG. 1, the second section 144 is associated with a message feed associated with a communication channel (e.g., #Channel A). In some examples, the message feed can indicate messages posted to and/or actions taken with respect to the channel, as described herein. In at least one example, the message feed can include an automated message 146 comprising a transcript 148 associated with a meeting. That is, the meeting management component 118 and/or the messaging component 116 can cause the transcript 148 of a meeting to be presented via an associated virtual space.

In the illustrative example, the message feed is presented via a first messaging sub-section 150. In at least one example, one or more sections of the transcript the user interface 140 can be selectable such that, when selected or otherwise actuated, the application 136 presents a thread 152 associated with the selected section. In the illustrative example, the thread 152 is presented via a second messaging sub-section 154 of the second section 144. In other examples, responsive to receiving an indication of selection of the selected section, the thread 152 may be presented in the second section 144, such as in lieu of the communication channel (e.g., encompassing most or all of the second section 144).

In at least one example, the operating system 138 can manage the processor(s) 128, computer-readable media 130, hardware, software, etc. of the user computing device 104.

The communication interface(s) 132 can include one or more interfaces and hardware components for enabling communication with various other devices (e.g., the user computing device 104), such as over the network(s) 106 or directly. In some examples, the communication interface(s) 132 can facilitate communication via Web Sockets, APIs (e.g., using API calls), HTTPs, etc.

The user computing device 104 can further be equipped with various input/output devices 134 (e.g., I/O devices). Such I/O devices 134 can include a display, various user interface controls (e.g., buttons, joystick, keyboard, mouse, touch screen, etc.), audio speakers, connection ports and so forth.

While techniques described herein are described as being performed by the application(s) 136, techniques described herein can be performed by any other component, or combination of components, which can be associated with the server(s) 102, the user computing device 104, or a combination thereof.

Figure 2:
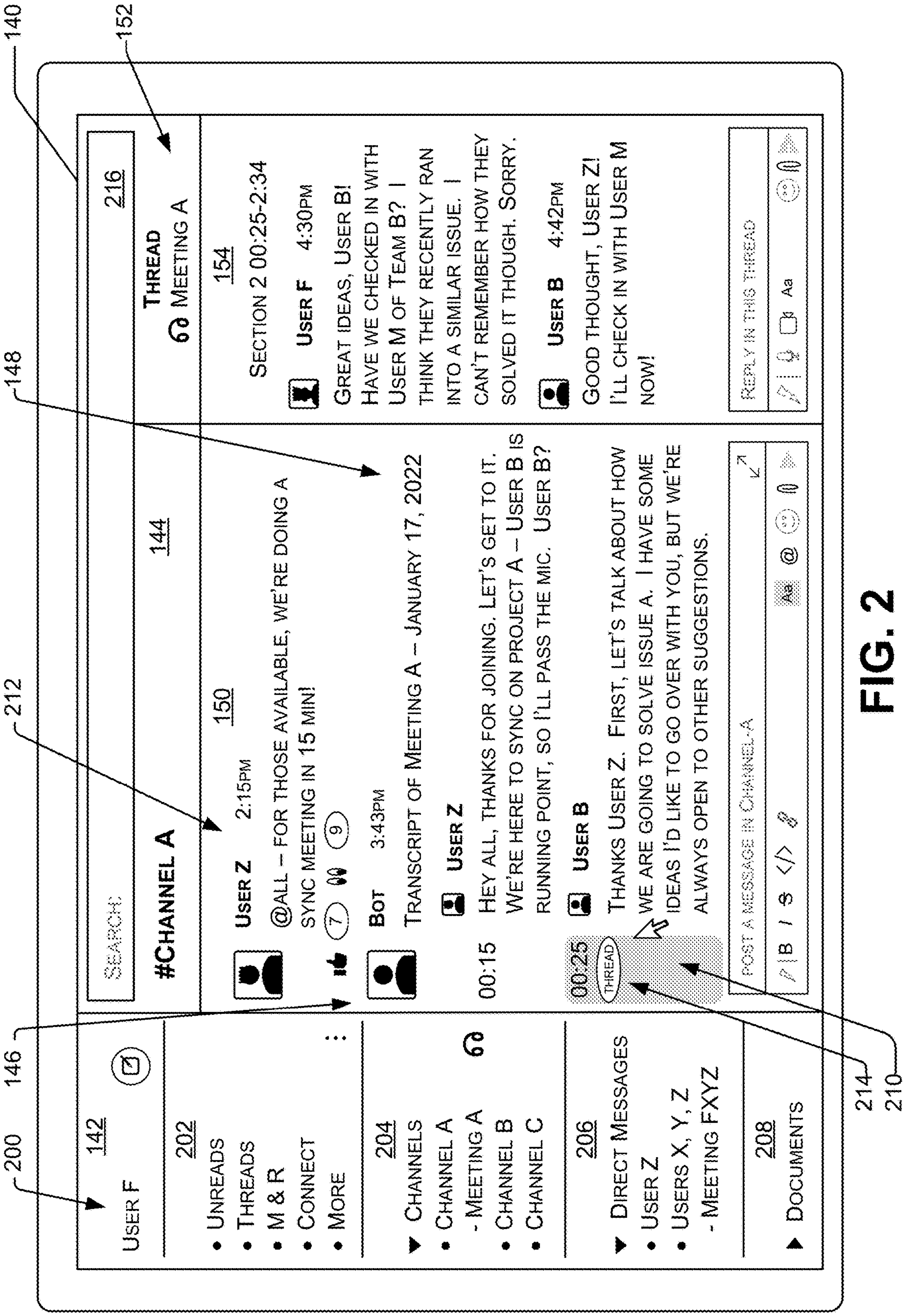
FIG. 2 illustrates an example user interface for enabling user input associated with a transcript of a meeting, as described herein.

FIG. 2 illustrates additional details associated with the user interface 140 configured to receive user input associated with a transcript 148 of a meeting. As discussed above, the user interface 140 can include a first section 142 that includes user interface element(s) representing virtual space(s) associated with the workspace(s) with which the user 200 (e.g., user account of the user) is associated. In at least one example, the first section 142 can include one or more sub-sections, which can represent different virtual spaces. For example, a first sub-section 202 can include user interface elements representing virtual spaces that can aggregate data associated with a plurality of channels and/or workspaces. In at least one example, each virtual space can be associated with a user interface element in the first sub-section 202. In some examples, a user interface element can be associated with an actuation mechanism, that when actuated, can cause an application, such as application 136, to present data associated with the corresponding virtual space via a second section 144 of the user interface 140.

In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second section 144, for example in a feed. In such examples, different types of events and/or actions, which can be associated with different communication channels and/or virtual spaces, can be presented via a same feed. In some examples, such data can be organized and/or is sortable by workspace, time, type of action, communication channel, user, or the like. In some examples, such data can be associated with an indication of which user (e.g., member of the communication channel) posted the message and/or performed an action.

In some examples, a virtual space can be associated with a same type of event and/or action. For example, "threads" can be associated with messages, files, etc. posted in threads to messages posted in a communication channel and "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. That is, in some examples, same types of events and/or actions, which can be associated with different communication channels and/or virtual spaces, can be presented via a same feed. As with the "unreads" virtual space, data associated with such virtual spaces can be organized and/or is sortable by workspace, time, type of action, communication channel, user, or the like.

In some examples, a virtual space can be a virtual space that can be associated with facilitating communications between a user and other users of the communication platform. For example, "connect" can be associated with enabling the user to generate invitations to communicate with one or more other users. In at least one example, responsive to receiving an indication of selection of the "connect" indicator, the communication platform can cause a connections interface to be presented in the second region 144.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via the user interface 140 (e.g., in the second region 144). In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents.

In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

In some examples, the first sub-section 202 can include a user interface element representative of a virtual space associated with one or more meetings. In some examples, the user interface element can be selectable to access one or more meeting instances (synchronous or asynchronous) with which the user is associated. The meetings can include audio and/or video content that is provided by one or more users of the communication platform. Additionally or alternatively, the first sub-section 202 can include a user interface element representative of a virtual space associated with multimedia clips (e.g., videos, audio files, stories, etc.) that is actuated by a user, multimedia clips associated with the user, which can be associated with different channels and/or virtual spaces, can be presented via the third section 144. In some examples, such multimedia clips can be presented via a feed. For the purpose of this discussion, a multimedia clip can correspond to audio and/or video content provided by a user associated with the communication platform.

In at least one example, the first section 142 of the user interface 140 can include a second sub-section 204, or sub-pane, that includes indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the second sub-section 204 can depict all communication channels, or a subset of all communication channels, that the user has permission to access (e.g., based on permission data associated with a user account as stored in user data 126). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the second sub-section 204 can depict all communication channels, or a subset of all communication channels, that the user is a member of, and the user can interact with the user interface 140 to browse or view other communication channels that the user is not a member of but are not currently displayed in the second sub-section 204. In some examples, different types of communication channels (e.g., public, private, shared, cross-workspace, etc.) can be in different sections of the second sub-section 204, or can have their own sub-sections or sub-panes in the user interface 140. In some examples, communication channels associated with different workspaces can be in different sections of the second sub-section 204, or can have their own sections or panes in the user interface 140.

In some examples, the indicators can have associated therewith one or more objects that are associated with a corresponding communication channel. An object can include a collaborative document, a task to be performed (e.g., task associated with a project or workflow associated with the communication channel), a ticket to be resolved, a calendar invitation, a calendar instance (e.g., scheduled meeting, appointment, etc.), a file (e.g., text, audio, video, etc.), a link to a local object, a link to a remote object (e.g., third-party object), and/or the like. In the illustrative example, a first communication channel (e.g., "Channel A") has associated therewith an affordance to access data associated with a meeting (e.g., "Meeting A"). The affordance can be configured to launch or initiate the meeting, access a meeting file (e.g., audio or video file), access an updated meeting file, access a transcript associated with the meeting file and/or the updated meeting file, and/or the like.

In addition to the second sub-section 204, the first section 142 can include a third sub-section 206, or sub-pane, that can include indicators representative of communications with individual users or multiple specified users (e.g., instead of all, or a subset of, members of an organization). Such communications can be referred to as "direct messages." That is, the third sub-section 206, or sub-pane, can include indicators representative of virtual spaces that are associated with private messages between one or more users.

In some examples, the first section 142 can include a fourth sub-section 208, or sub-pane, that can include indicators representative of collaborative documents with which the user account of user 200 is associated. That is, first section 142 can include a "documents" sub-section that includes affordances associated with one or more collaborative documents of which the user 200 is a member. In various examples, communication platform can identify one or more collaborative documents to associated with the documents sub-section (e.g., fourth sub-section 208) based on one or more ranking criteria. That is, the communication platform can cause affordances associated with highest ranking collaborative documents of which the user 200 is a member to be presented in the documents sub-section. In some examples, the user 200 can pin or otherwise associate one or more collaborative documents with the documents sub-section.

In at least one example, a label or other indicator associated with the fourth sub-section 208 can include an affordance that, when selected by the user 200, causes a documents interface to be presented in the second section 144 of the user interface 140. In some examples, the documents interface can include one or more lists of collaborative document(s) with which the user account of the user 200 is associated. For example, the documents interface can include a first list of personal collaborative documents associated with the user account and a second list of collaborative documents that include two or more members.

As described above, in at least one example, the user interface 140 can include a second section 144, or pane, that is associated with a feed indicating messages posted to and/or actions taken with respect to a channel and/or other virtual space (e.g., a virtual space associated with direct message communication(s), a virtual space associated with event(s) and/or action(s), etc.) for facilitating communications. As described above, in at least one example, data associated with the second section 144 is shown as a feed associated with a channel (e.g., Channel A). In some examples, the data in the feed can be organized and/or is sortable by date, time, type of action, user, or the like. In some examples, such data can be associated with an indication of which user posted the message and/or performed an action.

In at least one example, the data in the feed can include data associated with a single virtual space (e.g., Channel A). In some examples, the data in the feed can include data associated with two or more virtual spaces. In at least one example, data associated with a virtual space can be viewable to at least one of the users of the group of users associated with a same group identifier. In some examples, members of a virtual space, the content of the virtual space (e.g., messages, messaging communications, etc.) can be displayed to each member of the virtual space.

In at least one example, the format of individual virtual spaces may appear differently to different users. In at least one example, a common set of group-based messaging communications (e.g., messages) can be displayed to each member of a virtual space such that the content of the virtual space may not vary per member of the virtual space. In some examples, data associated with a virtual space can appear differently for different users (e.g., based on personal configurations, group membership, etc.). In some examples, the format of the individual virtual spaces may appear differently based on which workspace a user is currently interacting with or most recently interacted with. In some examples, the format of the individual virtual spaces, such as how messages and/or other data associated therewith (e.g., file attachments, emojis, reactji(s), etc.) are presented, may appear differently for different users (e.g., based on personal configurations, group membership, etc.).

For purposes of this discussion, a "message" can refer to any electronically generated digital object that is configured for display within a virtual space for facilitating communications as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a channel of the communication platform can include metadata comprising a sending user identifier, a message identifier, message contents, a group identifier, a channel identifier, or the like. In at least one example, each of the foregoing identifiers may comprise American Standard Code for Information Interchange (ASCII) text, a pointer, a memory address, or the like.

In some examples, a message 212 posted or published via a virtual space can be provided by a member of the virtual space (e.g., User Z). That is, the member can post the message to share information with other members of the virtual space (e.g., reminder of an upcoming sync meeting). In at least one example, a message posted via the channel can include an automated message 146 generated by the communication platform. The communication platform can be configured to generate automated messages based on one or more triggering events. In examples, the automated messages can be configured to transmit data to a particular user or a group of users via a virtual space (e.g., Channel A). In at least one example, the automated message can include a meeting transcript associated with a meeting conducted in association with or shared via the virtual space. In such an example, the triggering event can include an indication that the meeting transcript 148 is complete, a request to share the meeting transcript 148 via the virtual space, and/or the like.

In at least one example, a user associated with the virtual space can comment on a section of the meeting transcript 148 in a "thread," such as thread 152. In some examples, the user, such as user 200, can generate the thread by selecting a section 210 of the transcript 148. In response to the selection of the section 210, the communication platform (e.g., meeting management component 118) can determine whether the section 210 is rendered selectable for commenting. Based on a determination that the section 210 is not selectable for commenting, the communication platform can provide an indication thereof to the user 200 (e.g., no action taken, no thread 152 presented, notification that the section is not selectable presented, etc.). Based on a determination that the section 210 is selectable for commenting, the communication platform can cause the messaging feed associated with the virtual space (e.g., transcript 148, message 212, and/or other messages associated with the virtual space) to be presented in a first messaging sub-section 150 and the thread 152 to be presented in the second messaging sub-section 154. In other examples, in response to determining that the section 210 is selectable for commenting, the communication platform can cause the thread 152 to be presented in the second section 144, such as in lieu of the messaging feed associated with the virtual space.

In at least one example, after generation of the thread 152, one or more users who are members of the virtual space can view and/or post messages to the thread 152, such as by selection of a thread affordance 214 associated with the section 210 of the transcript 148. For example, a member of the channel may access the data associated with the thread 152 by selecting the thread affordance 214. In some examples, any user of the communication platform with access to the channel can comment on section 210 of the transcript 148 without being a member of the channel. In some examples, the thread affordance 214 may be hidden in a submenu associated with the section 210 of the transcript 148. Members of the channel may view and/or post messages via the thread 152. The messages and/or threads can be associated with file(s), emoji(s), reactji(s), app(s), etc. As discussed above, members of a channel who view and/or post messages via the thread may be considered members of the thread. As an illustrative example, at least users F and B may be identified as members of the thread 152.

In at least one example, the user interface 140 can include a search mechanism 216, wherein a user can input a search term and the server(s) 102 can perform a search associated with the communication platform. In some examples, the search can be performed across each workspace with which the user is associated, or the search can be restricted to a particular workspace, based on a user specification.

The user interface 140 is a non-limiting example of a user interface that can be presented via the user computing device 104 (e.g., by the application 136). In some examples, the application 136 can receive data from the messaging component 116 and/or meeting management component 118 and the application 136 can generate and present the user interface 140 based on the data. In other examples, the application 136 can receive data from the meeting management component 118 and instructions for generating the user interface 140 from the meeting management component 118. In such an example, the application 136 can present the user interface 140 based on the instructions. Additional or alternative data can be presented via a user interface and additional or alternative configurations can be imagined.

Additional functionalities associated with meetings, meeting transcripts, and threads associated therewith (e.g., the thread 152) are described in detail below with respect to FIGS. 3A-7.

Figure 3A:
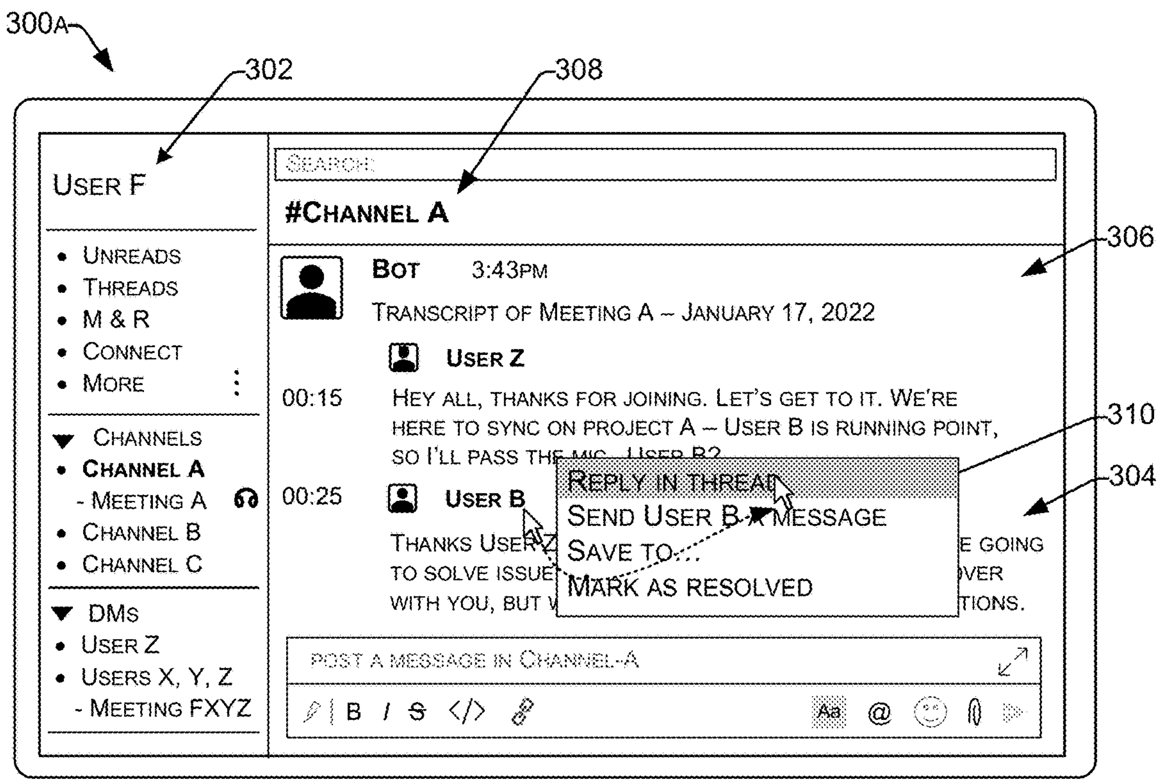
FIGS. 3A and 3B illustrate example user interfaces for selecting a section of a transcript and providing a user input associated therewith, as described herein.
Figure 3B:
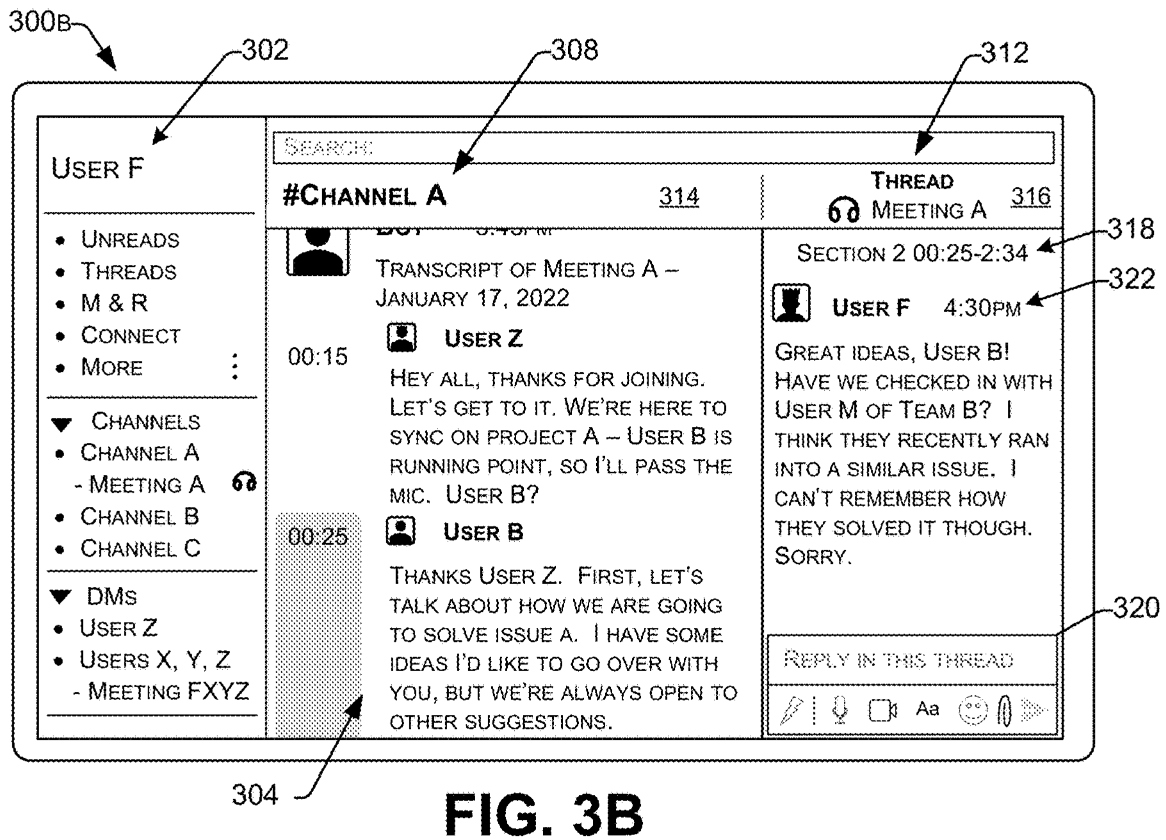

FIGS. 3A and 3B illustrate example user interfaces for selecting a section of a transcript and providing a user input associated therewith, as described herein. FIG. 3A illustrates an example user interface **300*a* in which a user 302 selects a section 304 of a transcript 306 published via a virtual space 308, such as transcript 148. Though illustrated as a communication channel (e.g., Channel A), this is not intended to be so limiting and the virtual space 308 can include another type of virtual space, such as a direct messaging instance, a collaborative document, and/or the like. That is, the virtual space 308** can include any virtual space selected by a meeting administrator or host of a meeting to associate with the meeting and/or to share a transcript of the meeting therein.

In at least one example, in response to receiving an indication of selection of the section 304, the communication platform can determine whether the section 304 is rendered selectable for commenting. In some examples, based on a determination that the section 304 is rendered selectable for commenting, the communication platform can cause a section options menu 310 to be presented in association with the section 304. In the illustrative example, the section options menu 310 includes a first option to reply in or start a thread associated with the section, a second option to send the user associated with the section (e.g., User B) a direct message, a third option to save the section 304 to a collaborative document or other file, and a fourth option to mark the section as resolved or complete. Though these options are merely provided for illustrative purposes and are not intended to be so limiting. Other options are contemplated herein, such as an option to tag another user, generate a task associated with the section 304, generate a poll associated with the section 304, and/or the like.

In some examples, based on a determination that the section 304 is rendered selectable for commenting, the communication platform can cause the first option (e.g., the option to reply in or start a thread associated with the section 304) to be presented in the section options menu 310. Though illustrated as a "reply in thread" option, this is not intended to be so limiting, and the option to reply to the section 304 in the thread can include another description, such as comment in thread, start a thread, provide feedback, or the like.

In at least one example, in response to receiving an indication of selection of the first option, the communication platform can cause presentation of a thread associated with the section 304 via the user interface **300*a*. In some examples, the thread can be presented in lieu of the virtual space 308 and/or messages published therein (e.g., transcript 306). In some examples, the thread can be presented concurrently with the virtual space 308, such as in a bifurcated screen showing the virtual space 308 and a thread associated with the section 304 of the transcript 306**.

FIG. 3B illustrates an example user interface **300*b* in which a thread 312 is presented concurrently with the virtual space 308. That is, data associated with the virtual space 308 is presented in a first messaging sub-section 314 and data associated with the thread 312 is presented in a second messaging sub-section 316. In other examples, the thread 312 can be presented in lieu of the data associated with the virtual space 308**.

In at least one example, the thread 312 can include a section indicator associated with the selected section 304. In the illustrative example, the section indicator 318 includes a numerical indicator of the section 304 (e.g., "section 2") and a range of times associated therewith. Though this is not intended to be so limiting and the section indicator 318 can include more or less information. For example, the section indicator 318 can include a start time associated with the section, an indication of the speaker or presenter associated with the section 304 (e.g., User B), and/or the like.

In at least one example, the communication platform can cause a comment input box 320 to be presented in association with the thread 312, enabling the viewing user (e.g., user 302) to publish a message 322 in association with the thread 312. For example, the user 302 can compose the message 322 in the comment input box 320 and cause the message 322 to be published in association with the thread 312. Other members of the virtual space 308 viewing the thread 312 can then view the message 322 posted by the user 302 and/or publish additional messages via the thread 312. Messages in the thread 312 can be presented in chronological order, such as based on a time (e.g., timestamp) in which each individual message was published in association with the thread 312. In some examples, a thread affordance may appear in section 304 if there are corresponding posted comments in the associated thread 312, such that clicking on the third affordance may cause the thread 312 to be displayed. In some embodiments, the thread affordance may indicate the number of messages that have been posted in the thread.

As discussed above, the communication platform can be configured to receive the message 322 and modify a meeting file (e.g., audio meeting file, video meeting file, etc.) associated with the transcript to include the message 322. In at least one example, the communication platform can include the message 322 in association with the section 304 in a modified meeting file. That is, the communication platform can include data associated with the message 322 to be presented in the modified meeting file after the section 304 and before a next (subsequent) section.

In some examples, the communication platform can be configured to modify a format of the message 322 from a text format to an audio format for incorporation into the meeting file. In examples in which the meeting is stored as a video meeting file, the communication platform can be configured to cause presentation of an image or group of images associated with the user 302 corresponding to the message 322. That is, the message 322 submitted by the user 302 may be converted to an audio format with an image or group of images associated with the user 302 presented, such as to inform another user viewing the modified meeting file that the user 302 is associated with the message 322.

In some examples, the communication platform can store metadata with the modified meeting file so that there are pointers that indicate when to pause the meeting file and jump to play back comments before returning to the original meeting. In at least one example, the pointers associated with the stored metadata can enable the communication platform to efficiently identify additional data to play in association with the meeting file (e.g., at a particular location) without modifying the meeting file and/or performing encoding thereon. As such, the pointers associated with stored metadata can improve the functioning of computing device(s) associated with the communication platform by enabling access to a modified meeting file without actually modifying the file in its entirety. Additionally, the pointers associated with the stored metadata can reduce an overall file size associated with the meeting file, thereby further improving the functioning of the associated computing device by reducing an amount of memory used to perform the functions described herein.

As discussed above, additional users may view and/or present additional comments in the thread 312. In such examples, additional comments can be presented in the modified meeting file in chronological order, such as in an order the messages were posted to the thread 312. In at least one example, the messages of the thread can be presented in the modified meeting file concurrently, such that data associated with the thread is presented together, in between the associated section 304 and a subsequent section of the transcript.

Figure 4A:
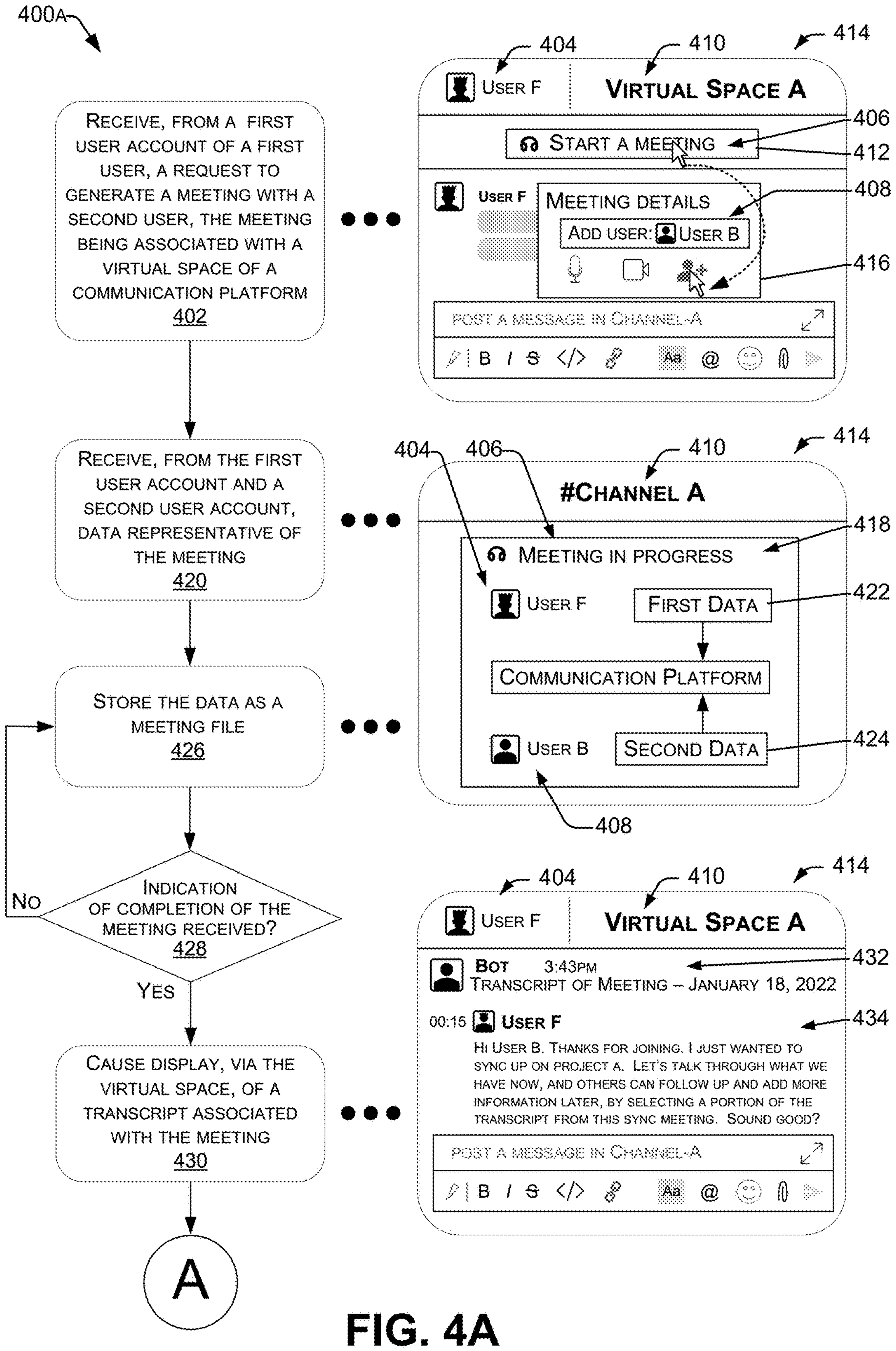
FIG. 4A is an example process for receiving data representative of a meeting and causing presentation of a transcript of the meeting via a virtual space, as described herein.

FIG. 4A is an example process 400*a* for receiving data representative of a meeting and causing presentation of a transcript of the meeting via a virtual space of a communication platform, as described herein.

At operation 402, the communication platform receives, from a first user account of a first user 404, a request to generate a meeting 406 with a second user 408, the meeting 406 being associated with a virtual space 410 of the communication platform, such as virtual space 308. In some examples, the request to generate the meeting 406 can include a selection, by the first user 404 of a meeting affordance 412 associated with initiating a meeting, presented via a user interface 414 of the communication platform, such as user interface 300*a*, user interface 300*b*, and/or the like. In the illustrative example, the meeting affordance 412 is presented in association with the virtual space 410.

In at least one example, in response to receiving the selection of the meeting affordance 412, the communication platform can cause a meeting detail input box 416 to be presented via the user interface 414. In the illustrative example, the meeting detail input box 416 can enable the first user 404 to select an affordance associated with an audio meeting or a video meeting. That is, the meeting detail input box 416 can provide a means by which the first user 404 can designate a type of meeting to be initiated. In some examples, the communication platform can select the type of meeting, such as based on a default setting. In such examples, the meeting detail input box 416 can include a means by which the first user 404 can select an alternate type of meeting. For example, a default setting may include an audio meeting and the meeting detail input box 416 can include an option to select to conduct a video meeting, or vice versa.

In some examples, in response to receiving the indication of selection of the meeting affordance 412, the communication platform can identify one or more members of the virtual space 410 who are online and available to conduct the meeting, and can cause an indication thereof via the meeting detail input box 416. For example, in response to the selection of the meeting affordance 412, the communication platform identifies that the second user 408 is available for the meeting 406 and causes a presentation of an identifier associated with the second user 408 in the meeting detail input box 416. Additionally, in some examples, the meeting detail input box 416 can include a means by which the first user 404 can select other users, such as the second user 408, to associate with the meeting 406.

In at least one example, the communication platform can receive user input via the meeting detail input box 416 can generate a meeting instance associated with the meeting 406, based on the user input. That is, the communication platform can generate and initiate the meeting instance between the first user 404 and at least one other user (e.g., the second user 408). In some examples, the communication platform can cause a meeting indicator 418 to be presented in association with the virtual space 410, such as to indicate that the meeting is in progress. In at least one example, the meeting indicator 418 can be presented to users participating in the meeting 406.

In some examples, the meeting indicator 418 can be presented to other users eligible for participation in the meeting (e.g., members of the virtual space 410), such to indicate that the meeting 406 is currently in progress. In some examples, the meeting indicator 418 can include an affordance that, when selected, enables another user not previously participating in the meeting 406 to initiate joining the meeting. In some examples, in response to receiving an indication of selection of the affordance associated with the meeting indicator 418, the communication platform can automatically add the other user to the meeting instance associated with the meeting 406. In some examples, the communication platform may cause a notification to be presented to the administrator or host of the meeting (e.g., the first user 404), to enable the administrator or host to allow (or deny) the other user access to the meeting 406.

At operation 420, the communication platform receives, from the first user account and a second user account associated with the second user 408, data representative of the meeting. That is, the communication platform can receive first data 422 from the first user account and second data 424 from the second user account. Though illustrated as first data and second data received from the first and second user accounts, this is not intended to be so limiting, and the communication platform can receive a plurality of data from one or more participants of the meeting 406 (e.g., users accessing the meeting instance).

At operation 426, the communication platform stores the data (e.g., first data 422, second data 424) as a meeting file. The meeting file can include an audio meeting file or a video meeting file, such as based on the type of meeting being conducted.

At operation 428, the communication platform determines whether an indication of completion of the meeting 406 is received. In some examples, the indication of completion can include an indication from the administrator or host that the meeting is complete. In some examples, the indication of completion can include an indication that a threshold number or percentage of participants in the meeting have closed a meeting interface (e.g., associated with the meeting indicator 418) or departed the meeting. For example, based on a determination that the second user 408 departs the meeting 406, leaving only the first user 404 in the meeting 406, the communication platform may identify an indication of completion of the meeting 406. For another example, the communication platform may identify the indication of completion after both the first user 404 and the second user 408 depart the meeting.

Based on a determination that the indication of completion of the meeting 406 has not been received ("No" at operation 428), the communication platform can continue to store the data in association with the meeting file. Based on a determination that the indication of completion of the meeting 406 has been received ("Yes" at operation 428), the communication platform, at operation 430, causes display, via the virtual space 410, of a transcript 432 associated with the meeting 406, such as transcript 148, transcript 306, etc. As discussed above, the transcript 432 can include one or more sections 434 of data representative of the meeting. For example, the illustrated section 434 can represent first data 422 received from the first user 404 during the meeting. In at least one example, the section 434 of the transcript 432 can be selectable, such as to enable a viewing user to generate a thread in association with a selected section 434.

Figure 4B:
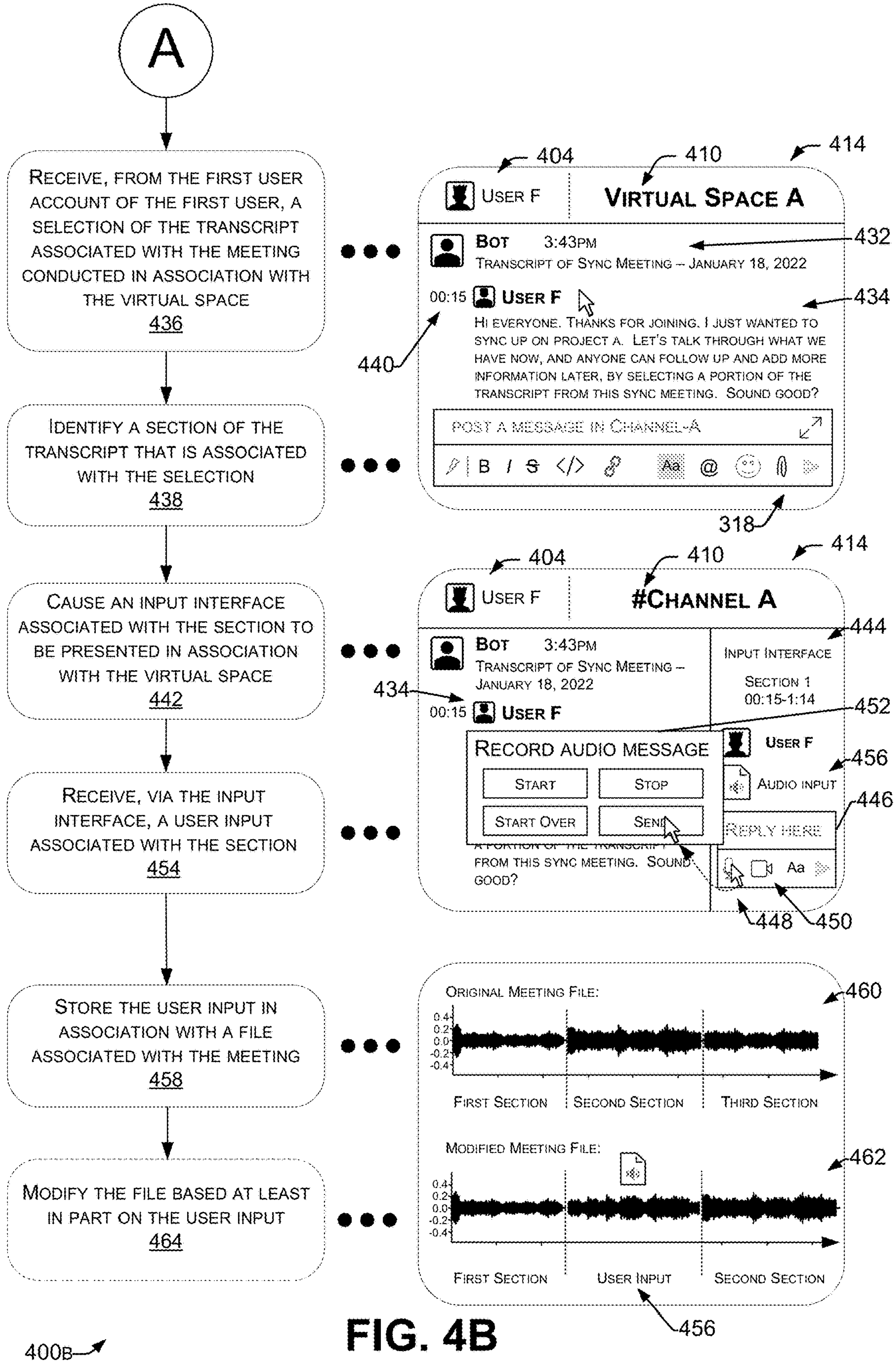
FIG. 4B is an example process for receiving user input associated with a transcript of a meeting and modifying a file associated with the meeting based on the user input, as described herein.

FIG. 4B is an example process 400*b* for receiving user input associated with a transcript of a meeting and modifying a file associated with the meeting based on the user input, as described herein.

At operation 436, the communication platform receives, from the first user account of the first user 404, a selection of the transcript 432 associated with the meeting 406 conducted in association with the virtual space 410. Though illustrated as being from the first user account, the transcript 432 can be viewable and/or selectable by another user of the virtual space 410, such as the second user 408 and/or another user not in attendance of the meeting. As such, the published transcript 432 can enable continued collaboration after a meeting 406 has been conducted by those in attendance and also other users who were unable to attend the meeting 406.

At operation 438, the communication platform identifies a section 434 of the transcript 432 that is associated with the selection. As discussed above, the communication platform can determine different sections of a meeting 406 and/or a transcript 432 based on a user corresponding to the associated data (e.g., speaker, presenter, etc.), predetermined section intervals (e.g., 30 second interval, 1 minute interval, etc.), breaks in conversation over threshold period (e.g., user stops talking for 3 seconds, new section initiated), an express instruction or keyword to initiate a new section (e.g., "break," "new section," etc.), and/or the like.

In at least one example, a section 434 can be presented with a corresponding section indicator 440, the section indicator 440 providing an indication of an individual section. In the illustrative example, the section indicator 440 includes a start time associated with the section 434. For example, the first user 404 started talking 15 seconds after initiating the meeting 406. In some examples, the section indicator 440 can include a range of times, such as a start time and end time associated with the section. In some examples, the section indicator 440 can additionally include an indication of a numerical order or the respective section. For example, because the illustrated section 434 is a first section associated with the transcript 432, the section indicator 440 could include a "Section 1," an "Section A," and/or the like.

At operation 442, the communication platform causes an input interface 444 associated with the section 434 to be presented in association with the virtual space 410. In at least one example, the input interface 444 can include a messaging thread interface, such as to enable one or more users associated with the virtual space to submit comments on the associated section 434. In various examples, the input interface 444 can include an input box 446 configured to enable the first user 404 to submit user input (e.g., enter in a comment, reply, etc.) associated with the selected section 434. In some examples, the input box 446 can be configured to receive text entry, such as to enable the first user 404 to type in the user input.

In some examples, the input box 446 can include an audio option 448 and/or a video option 450, such as to enable the first user 404 to submit an audio and/or video comment via the input interface 444. In the illustrative example, the first user 404 submits the audio option 448, to submit an audio comment in association with the selected section 434. In response to receiving an indication of selection of the audio option 448, the communication platform can cause a recording control 452 to be presented in association with the input interface 444. As illustrated, the recording control 452 can include controls for the first user 404 to start and stop an audio recording, start over (e.g., delete a previous user input), and/or cause the audio recording to be published via the input interface (e.g., "send"). Though this is not intended to be limiting and other controls are contemplated herein, such as a listen to recording option. Additionally, though illustrated as a recording control 452 associated with providing an audio input, a same or similar recording control 452 can be associated with the video option 450, enabling the first user 404 to start, stop, start over, and submit a video recording in association with the input interface 444.

At operation 454, the communication platform receives, via the input interface 444, a user input 456 associated with the section 434 (e.g., selected section 434). As discussed above, the user input 456 can include an audio input, a video input, a text input, or a combination thereof. In some examples, the communication platform can store the user input 456 in association with the meeting file in the submitted format. In some examples, the communication platform can store the user input 456 in the submitted format based on a determination that a format of the user input 456 (e.g., text, audio, video) matches a format of the meeting file.

In some examples, in response to determining that the format of the user input 456 is different from the format of the meeting file, the communication platform can modify the format of the user input 456 based on the format of the meeting file. For example, in response to determining that the user input 456 includes a text input and the meeting file includes an audio file, the communication platform can modify the format of the user input 456 to an audio file format. For another example, in response to determining that the user input 456 includes an audio input and the meeting file includes a video file, the communication platform can associate one or more images with the user input 456, to provide a visualization associated with the user input 456. In some examples, the image(s) can include images associated with the user associated with the user input 456 (e.g., the first user 404), such as an avatar, one or more images stored in association with the first user account, and/or the like.

At operation 458, the communication platform stores the user input 456 in association with a file 460 associated with the meeting (e.g., audio meeting file, video meeting file, etc.). In some examples, the communication platform can store the user input 456 as metadata associated with the file 460. In some examples, the communication platform can store the user input 456 with a pointer corresponding to the selected section 434 of the of the transcript 434. In such examples, the pointer can cause the communication platform to, in response to a request to access a modified meeting file 462 (e.g., original file 460 with comments submitted via one or more threads), cause the user input 456 to be presented in between the selected section 434 (e.g., first section) and a next section (e.g., second section) of the file 460. In some examples, by storing the user input 456 in association with the file 460 with a pointer indicating the associated section (e.g., the selected section 434), the techniques described herein can improve the functioning of a computing device associated with the communication platform by saving processing power associated with modifying a file 460, re-encoding the file 460, compressing the file 460, and re-uploading the file 460. Additionally or alternatively, the communication platform can store the user input 456 as metadata in a separate file in a datastore, such as datastore 122. In some examples, the separate file can include an association with the file 460, the transcript 432, and/or the meeting, generally.

At operation 464, the communication platform can optionally modify a file (e.g., meeting file) associated with the meeting based at least in part on the user input 456. In at least one example, the communication platform can add the user input 456 to the meeting file subsequent to the selected section 434 (e.g., first section) and prior to a next section (e.g., second section) of the transcript 432. That is, the communication platform can modify the meeting file to include the user input 456 in association with the selected section 434. For example, as illustrated, the original meeting file 460 includes a first section, a second section, and a third section and a modified meeting file 462 includes the first section, followed by the user input, followed by the second section, and the third section (not illustrated).

In at least one example, the communication platform can receive a request, from a user associated with the meeting 406 and/or the virtual space 410, to access the meeting file. In examples in which the request is received subsequent to the modification described with regard to operation 458, the communication platform can cause presentation of a modified meeting file including the user input 456.

Figure 5:
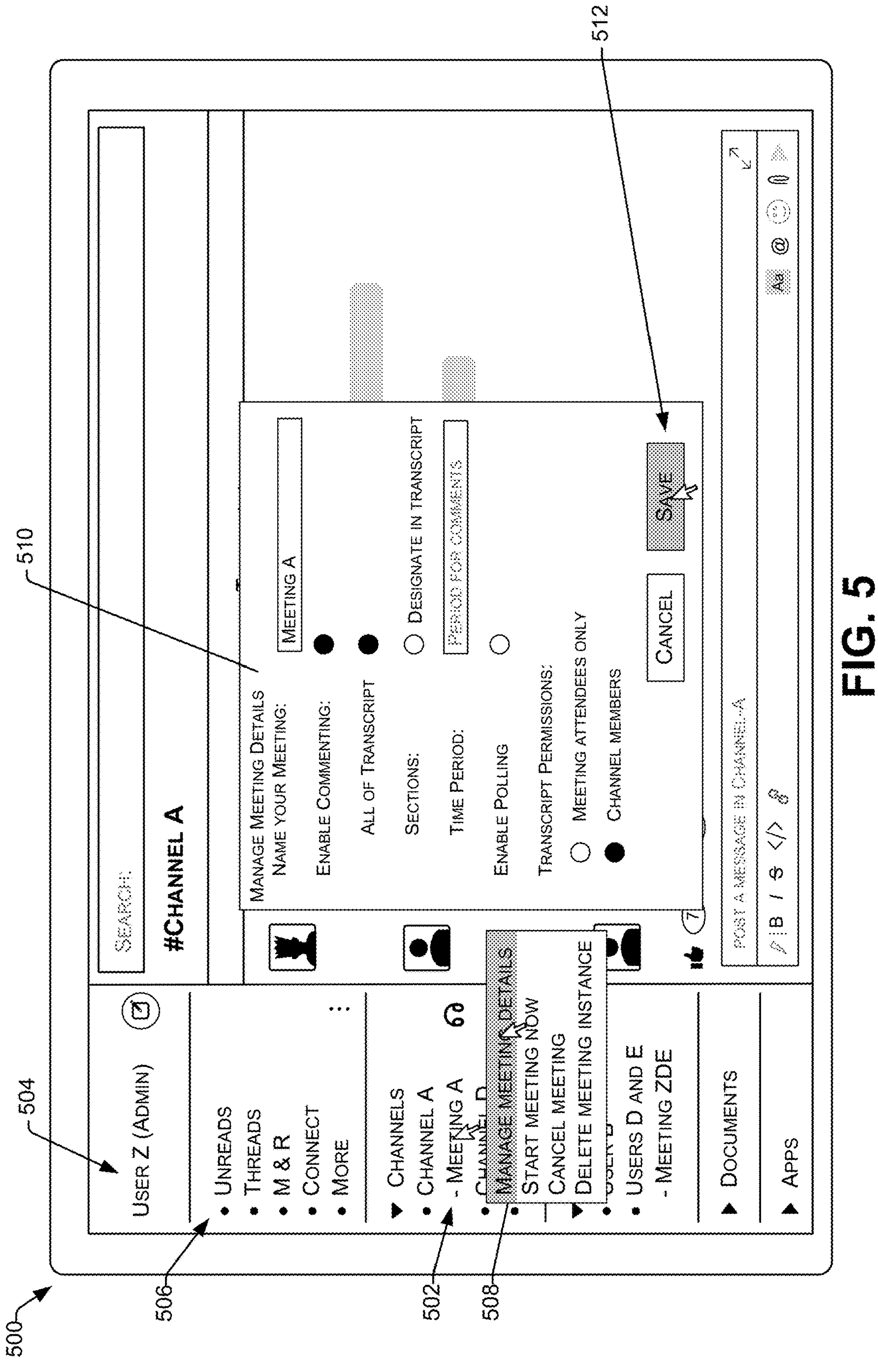
FIG. 5 illustrates an example user interface for managing meeting details associated with a meeting conducted in association with a communication platform, as described herein.

FIG. 5 illustrates an example user interface 500 for managing meeting details associated with a meeting conducted in association with a communication platform, as described herein. In at least one example, the communication platform can be configured to cause display of an affordance 502 associated with a meeting, such as meeting 406, of which a user 504 is associated, in a sidebar 506 of the user interface 500. As used herein, the sidebar 506 can include all or a portion of a first section of the user interface 500, such as first section 142 of FIG. 1.

In some examples, the communication platform can cause display of the affordance 502 in the sidebar 506 based on a determination that the user 504 is an administrator or host of the associated meeting. In some examples, the communication platform can cause display of the affordance 502 in the sidebar 506 based on a determination that the user 504 is a member of the meeting (e.g., previous attendee, invitee, etc.) and/or a member of a virtual space associated with the meeting (e.g., Channel A).

In the illustrative example, in response to receiving an indication of selection of the affordance 502, the communication platform causes a meeting control box 508 to be presented in association with the affordance 502. In some examples, the meeting control box 508 can include one or more options for controlling one or more aspects of the associated meeting. Non-limiting examples of the option(s) include managing meeting details, starting the meeting now, canceling the meeting, deleting the meeting instance, scheduling the meeting for a time in the future, and sending a reminder about an upcoming meeting, to name a few options. In at least one example, one or more of the options included in the meeting control box 508 can be included based on a determination that the user 504 is an administrator or host of the meeting. For example, the manage meeting details can be included in the meeting control box 508 associated with an administrator or host of the meeting. That is, the administrator or host account can include permissions to manage details associated with the meeting.

In the illustrative example, in response to receiving an indication of selection of the option to manage meeting details, the communication platform can cause a meeting details input box 510 to be presented via the interface 500. In some examples, the meeting details input box 510 can provide a means by which the user 504 can name or re-name an associated meeting. In some examples, the meeting details input box 510 can additionally provide an option for the user 504 to enable (or disable) commenting associated with a transcript of the meeting, as described herein. In the illustrative example, the user 504 selects to enable commenting on the entirety of the associated transcript. In other examples, the user 504 can select an option to designate select sections of the transcript enabled (or disabled) for commenting. That is, the communication platform can provide the user 504 an option to, prior to publication via the virtual space, render one or more sections of the transcript selectable (or not selectable) for commenting.

In some examples, the meeting details input box 510 can include an option to set a time period for commenting. The time period can include a period of time (e.g., one week, one month, etc.) or a date to terminate commenting (e.g., disable the commenting feature associated with the transcript). For example, the user 504 can input a specific date in which to disable commenting associated with the transcript.

In some examples, the meeting details input box 510 can include a polling option, to enable the user 504 to associate a poll (e.g., a polling interface) with the transcript. In some examples, in response to receiving an indication of selection of the polling option, the communication platform can request additional details from the user 504 associated with the poll. The additional details can include questions to be asked in the poll, a time period for rendering the poll active, where to publish results (e.g., associated virtual space, send to user 504, etc.), whether all or a portion of the poll is to be rendered anonymously, and/or the like. In some examples, in response to receiving the indication of selection of the polling option, the communication platform can be configured to analyze the contents of the meeting to identify one or more questions or options associated with the poll. That is, the communication platform can be configured to analyze, utilizing natural language processing, machine learning, and/or related techniques, the contents of the meeting to identify details associated with the poll. As will be discussed in greater detail with regard to FIG. 7, the communication platform can cause presentation of the poll in association with the transcript published via the virtual space.

In various examples, the meeting details input box 510 can additionally include an option to establish permissions associated with viewing the transcript of the meeting. In some examples, the communication platform can enable the user 504 to limit access to the transcript to meeting attendees or to share with members of the associated virtual space, regardless of meeting attendance. In an example in which the user 504 selects to limit access to the transcript to the meeting attendees, the communication platform can cause presentation of an automated message including the transcript in association with the user accounts of the meeting attendees. The automated message can be presented via the virtual space or via a direct messaging instance between the meeting attendees.

In at least one example, in response to receiving an indication of a save option 512 associated with the meeting details input box 510, the communication platform can store the meeting details in association with the meeting.

Figure 6A:
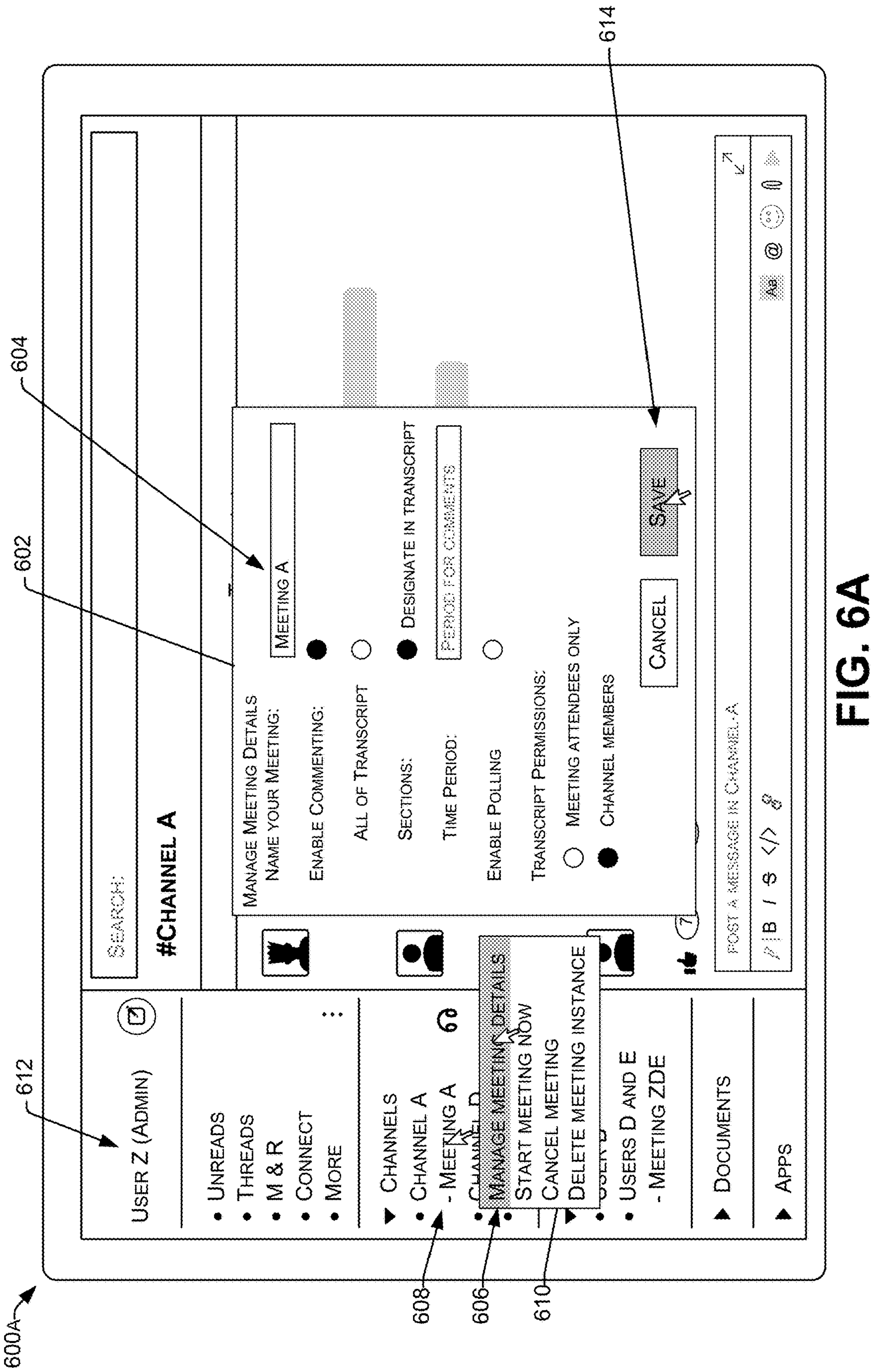
Figure 6C:
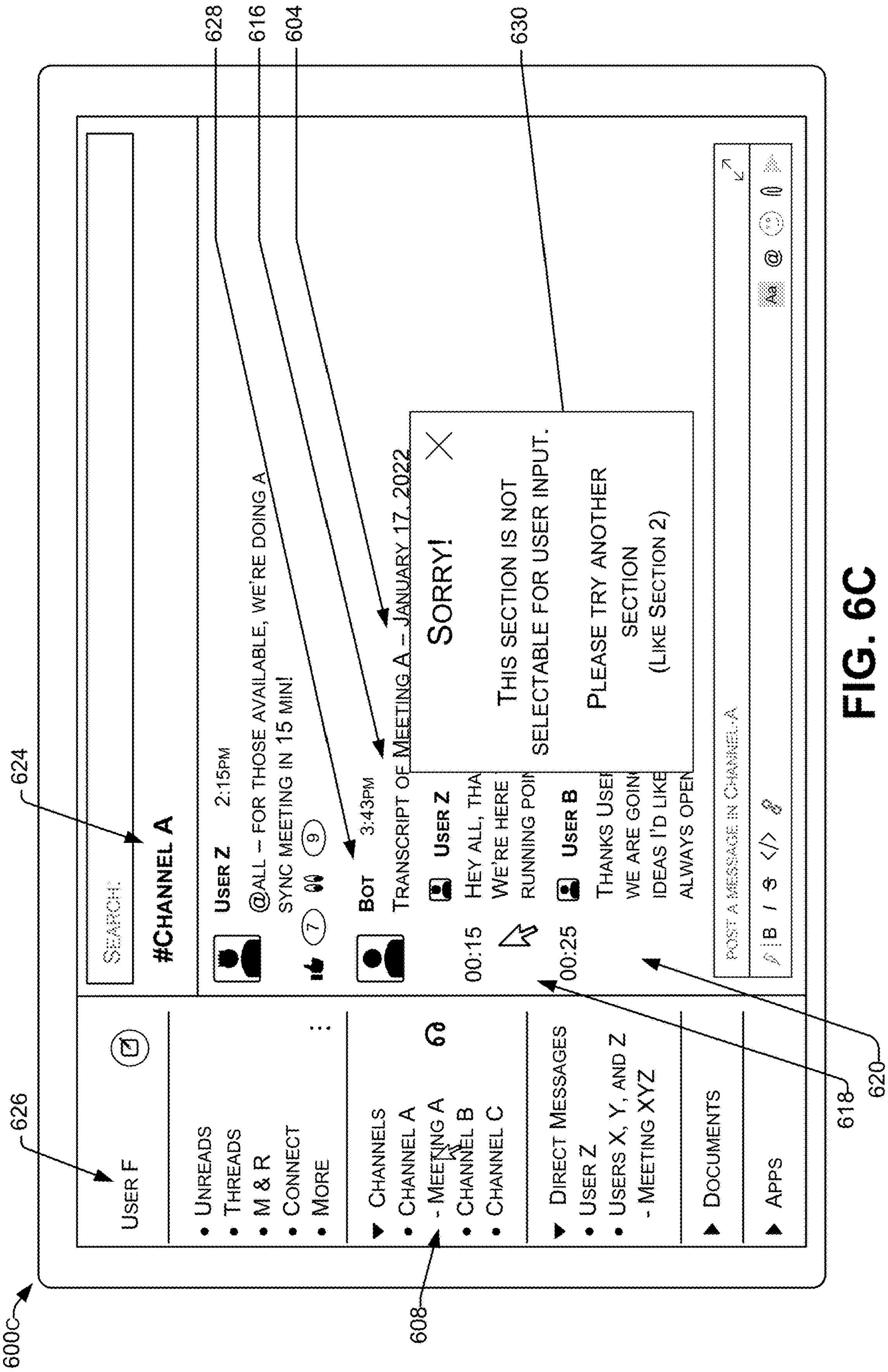

FIGS. 6A-6C illustrate example user interfaces for rendering portions of a transcript of a meeting selectable for commenting and presenting a failure notification in response to receiving a selection of a portion that is not rendered selectable for commenting, as described herein. FIG. 6A illustrates an example user interface 600*a* in which a meeting details input box 602, such as meeting details input box 510, is presented in association with a meeting 604. In at least one example, the communication platform can cause display of the meeting details input box 602 in response to receiving an indication of selection of a manage meeting details option 606 corresponding to an affordance 608 associated with the meeting 604. As discussed above with regard to FIG. 5, the manage meeting details option 606 can be included as an option in a meeting control box 610, such as meeting control box 508 presented in response to a selection of the affordance 608.

Additionally, as discussed above, in some examples, the meeting details input box 602 can provide an option for a user 612, such as user 504, to enable (or disable) commenting associated with a transcript of the meeting 604, as described herein. In the illustrative example, the user 612 selects to enable commenting on select sections of the transcript, such as by designating the sections enabled (or disabled) for commenting in the transcript. In response to receiving a selection of the save option 614, such as save option 512, the communication platform can store an indication to request, from the user 612, to select one or more sections of the transcript, after a generation thereof. In at least one example, the communication platform can request input from the user 612 with respect to the designated sections prior to rendering the transcript available for other users to view.

Though not illustrated, in some examples, the meeting details input box 602 can provide an option for the user 612 to enable commenting associated with a transcript for select individuals. That is, the communication platform can render one or more sections of the transcript available for commenting in association with user interfaces associated with select individuals and render the section(s) unavailable for commenting in association with user interface(s) associated with other individuals (e.g., other members of the virtual space not selected for commenting). For example, the meeting details input box 602 can include an option to enable commenting for meeting attendees. In response to receiving an indication of selection of the option to limit commenting to meeting attendees, the communication platform can cause instances of the transcript to be selectable for the meeting attendees (e.g., user identifiers associated with attendance of the meeting 604). For another example, the meeting input box can include an option to input select user identifiers for enabling commenting. In response to receiving one or more user identifiers as those selected to enable commenting, the communication platform can cause instances of the meeting transcript presented in association with user account(s) associated with the user identifier(s) to be selectable for commenting.

FIG. 6B illustrates an example user interface 600*b* in which a transcript 616 associated with the meeting 604 is presented for the user 612 to render one or more sections selectable for commenting. In at least one example, the communication platform can provide a notification or message to the user 612, such as to inform the user that the transcript 616 has been generated and is available for rendering section(s) available for commenting. For example, the communication platform can cause the affordance 608 to be presented in bold text, to provide the indication that the transcript is available. In such an example, the user 612 can select the affordance 608 to access the transcript 616. For another example, the communication platform can cause presentation of an automated message in association with a user account of the user 612, such as in a direct messaging instance, via the virtual space and viewable to the user 612, and/or the like. In such an example, the automated message can include an interface element that, when selected by the user 612, causes the transcript 616 to be presented via the user interface 600*b*.

In at least one example, in response to receiving an indication of selection of the affordance 608 or other interface element associated with the meeting, the communication platform can cause the newly generated transcript 616 to be presented to the user 612. In the illustrative example, the transcript 616 includes a first section 618 (with a first start time 00:15), a second section 620 (with a second start time 00:25), and a third section 622 (with a third start time 01:05), though this is not intended to be limiting and the transcript 616 can include greater or fewer number of sections.

In some examples, the user 612 may individually select each section to determine whether to render the selected section enabled for commenting. For example, the user 612 selects the first section (e.g., section (1)) not selectable for commenting, the second section (e.g., section (2)) selectable for commenting, and so on. In at least one example, the communication platform can render the first section 618, the second section 620, and/or third section 622 selectable for commenting, such as in a default action. In such an example, the user 612 can select designated section(s) with which to disable commenting associated therewith. For example, the user 612 can select the first section (e.g., section (1)) to disable commenting. Alternatively, the communication platform can render the first section 618, the second section 620, and/or third section 622 not selectable for commenting, such as in the default action. In such an example, the user 612 can select designated section(s) with which to enable commenting associated with the transcript. For example, the user 612 can select the second section (e.g., section (2)) to enable commenting.

In various examples, in response to receiving an indication that the user 612 has completed designating sections of the transcript 616 for commenting, the communication platform can cause display of the transcript 616 via the associated virtual space (e.g., Channel A).

FIG. 6C illustrates an example user interface 600*c* in which the transcript 616 is published via the associated virtual space 624 in association with a user account of another user 626 (e.g., member of the virtual space 624). In the illustrative example, the transcript 616 is published as an automated message 628, such as automated message 146, in the virtual space 624. In another example, the communication platform can publish the transcript 616 in a message from the user account associated with an administrator or host of the meeting 604 (e.g., User Z).

In the illustrative example, the communication platform receives, from the other user 626, an indication of selection of the first section 618 of the transcript 616. Based on a determination that the first section 618 was rendered disabled for commenting by the user 612 (e.g., administrator, host, etc.), the communication platform causes display of a notification 630 in association with the transcript 616. The notification can include a pop-up, overlay, or other type of notification. In some examples, the notification can provide an indication that the selected section (e.g., the first section 618) is not selectable for commenting. In some examples, the notification can additionally include an indication of one or more other sections that are selectable for commenting. For example, the notification 630 includes an indication that the second section 620 is selectable for commenting. Alternatively, in some examples, the notification 630 can provide an indication that the administrator or host has disabled commenting on the transcript. In such examples, the transcript 616 can be provided in a read-only format.

Figure 7:
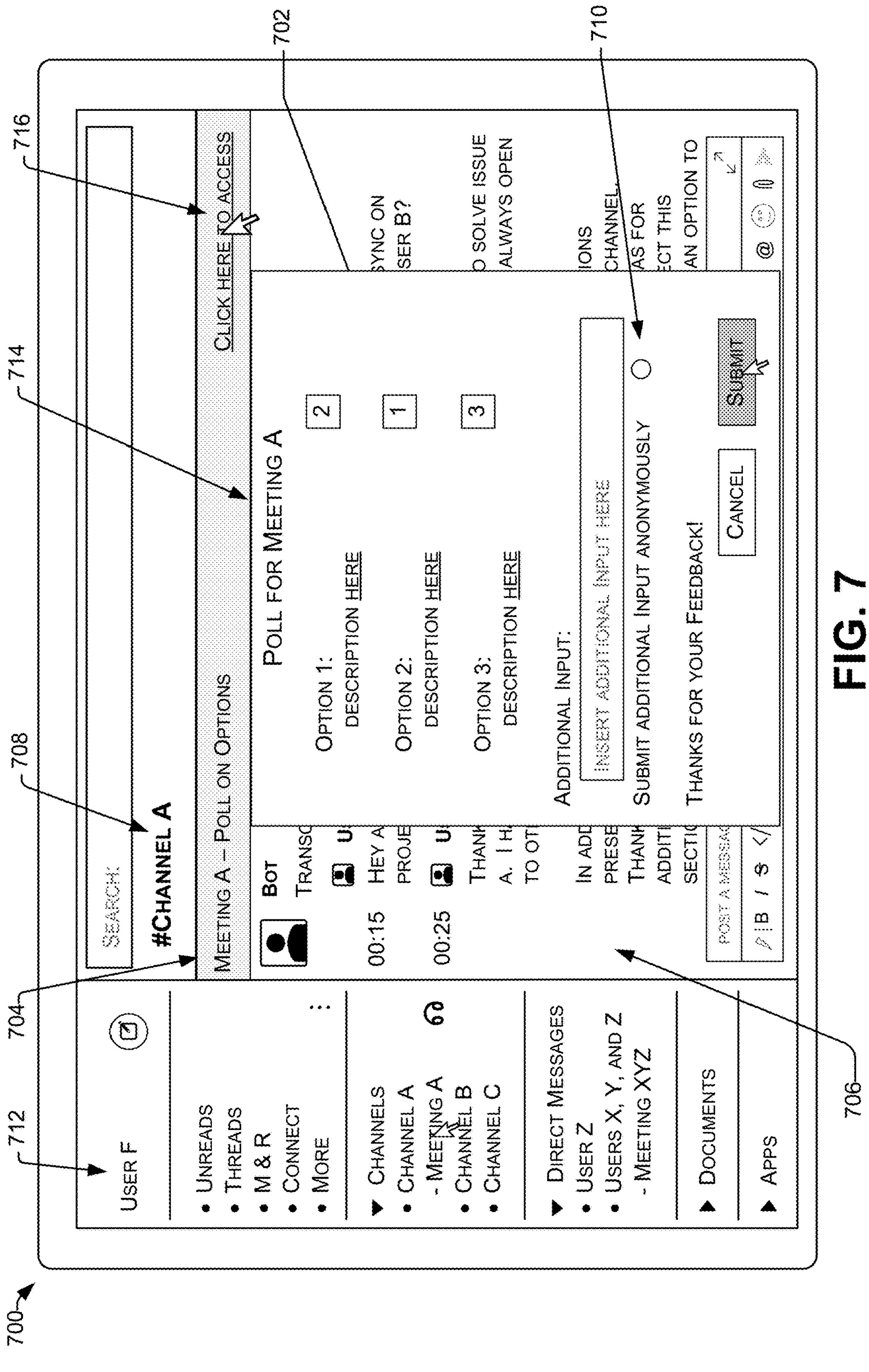
FIG. 7 illustrates an example user interface for presenting a poll associated with a meeting in association with a transcript of the meeting, as described herein.

FIG. 7 illustrates an example user interface 700 for presenting a poll 702 associated with a meeting 704 in association with a transcript 706 of the meeting 704 published via a virtual space 708, as described herein. As discussed above, the communication platform can be configured to generate the poll 702 for voting, receiving additional feedback, and/or the like associated with a meeting 704.

In some examples, the communication platform can generate the poll 702 in response to receiving a request (or instruction) to generate the poll 702, such as from an administrator, host, or other user associated with the meeting 704 (e.g., meeting attendee, meeting viewer, etc.). In such examples, the communication platform can generate the poll 702 based on polling characteristics included in the request (or instruction). Non-limiting examples of polling characteristics include question(s) or options to be included in the poll, topic(s) to be associated with an input box in which other users can submit their input, a period of time to render the poll available for input, and/or the like.

In some examples, the polling characteristics can include input anonymity, such as to render some or all of the feedback submitted via the poll anonymous or to provide an option to enable a viewing user to select in order to render one or more portions of submitted input anonymous. In some examples, the portion(s) can be rendered anonymous automatically based on a selection to render results anonymous. In some examples, the communication platform can enable an anonymity option 710 for the viewing user 712 to select all or a portion of the user input associated with the poll 702 anonymous. In the illustrative example, the anonymity option 710 includes an option to submit an additional input anonymously. Though this is not intended to be so limiting, and in other examples, the anonymity option 710 can provide a means by which the user 712 can submit all or different portions of the poll anonymously.

In various examples, in response to receiving the polling characteristics associated with the poll 702, the communication platform can generate a polling interface 714 to be presented in association with the transcript 706 published via the virtual space 708. In at least one example, the communication platform can cause presentation of an affordance 716 associated with the poll 702 to be presented via the virtual space 708 in association with the transcript 706. In response to receiving an indication of selection of the affordance 716, the communication platform can cause the polling interface 714 to be presented in association with the virtual space 708.

In some example, the communication platform can be configured to determine the polling characteristics associated with the poll 702 and generate the polling interface 714 automatically, such as based on content included in the meeting 704 (e.g., statements made, conversations that took place, etc.). That is, the communication platform can be configured to analyze the content of the data representative of the meeting 704 to identify a potential poll, such as utilizing natural language processing techniques, machine learning techniques, and/or the like. In some examples, in response to identifying the potential poll, the communication platform can generate a polling interface 714 associated with the poll 702, to associate with the transcript 706.

In some examples, in response to identifying the potential poll, the communication platform can send a request for confirmation to the administrator or host of the meeting, such as to receive an explicit confirmation to associate the polling interface 714 with the transcript 706. In some examples, the request for confirmation can include an interface to enable the administrator or host to modify polling characteristics associated with the platform-generated polling interface. In response to receiving confirmation and/or modified polling characteristics, the communication platform can cause presentation of the affordance 716 associated with the polling interface 714 via the virtual space 708 in association with the transcript 706 of the meeting 704.

In various examples, the communication platform can be configured to receive user input via instances of the polling interface 714 and store results of the poll 702 in association with a meeting file of the meeting 704. In some examples, the communication platform can be configured to send the user input and/or aggregated results of the poll 702 to the administrator or host of the meeting 704. In some examples, the communication platform can provide the administrator or host with a link to access the results, such as in an automated message directed to the administrator or host. In some examples, the communication platform can be configured to publish the results (e.g., aggregated results) of the poll via the virtual space, such as in association with the transcript. In some examples, the communication platform can include a link to the results, aggregated and/or individually submitted inputs), in association with the transcript 706.

In at least one example, the communication platform can determine whether all or a portion of an individual response to a poll (e.g., individual user input) was submitted anonymously. In response to determining that all or a portion of the individual response was submitted anonymously, the communication platform can withhold data associated with the identity of the submitting user from all or a portion of the user input. In some examples, the communication platform can store the user identifiers associated with polling results as metadata associated with the poll and/or the polling results in a datastore, such as datastore 122.

FIGS. 8-11 are flowcharts showing example processes involving techniques as described herein. The processes illustrated in FIGS. 8-11 are described with reference to components described above with reference to the system 100 shown in FIG. 1 for convenience and ease of understanding. However, the processes illustrated in FIGS. 8-11 are not limited to being performed using the components described above with reference to the system 100. Moreover, the components described above with reference to the system 100 are not limited to performing the processes illustrated in FIGS. 8-11.

FIG. 8 illustrates an example process 800 for modifying a file associated with a meeting based on user input received via a meeting transcript, as described herein.

At operation 802, a server 102 receives, from a user account of a user, a selection of a meeting transcript published via a virtual space of a communication platform. In at least one example, the server 102 can receive an indication of the selection from a client associated with the user account (e.g., user computing device 104, instance of a communication platform application 136, etc.). As discussed above, the meeting transcript can be generated by the communication platform (e.g., the server 102) in response to receiving data representative of a meeting. In at least one example, the server 102 can generate the meeting transcript in response to receiving an indication that the associated meeting is complete. In various examples, the server 102 can store the meeting transcript in association with a meeting file of the meeting, such as in a datastore 122.

In at least one example, the server 102 can identify a virtual space that is associated with the meeting (e.g., meeting conducted in association with the virtual space, receive a request to share the meeting transcript via the virtual space, etc.). In such an example, the server 102 can cause the meeting transcript to be published via the virtual space. In some examples, the meeting transcript can be published as an automated message generated by the communication platform. In some examples, the meeting transcript can be published in association with a user account of a user, such as an administrator or host of the meeting.

As discussed above, the server 102 can render one or more sections of the meeting transcript selectable for commenting. That is, the meeting transcript can be configured to enable a viewing user to select a section thereof and generate a thread associated with the selected section, to submit a comment associated with the section. In some examples, the server 102 can be configured to render each section of the meeting transcript selectable for commenting. In some examples, the server 102 may receive user input, such as from an administrator or host of the meeting, indicating the one or more sections to render selectable for commenting and/or one or more other sections in which to disable commenting (e.g., render not selectable).

At operation 804, the server 102 identifies a section of the meeting transcript associated with the selection. In at least one example, the section can be identified based on a location of a cursor, touch input, and/or the like associated with the selection.

At operation 806, the server 102 determines whether the section is designated as selectable for commenting. As discussed above, the server 102 can render a first group of sections of the meeting transcript selectable for commenting and/or a second group of sections of the meeting transcript disabled for commenting. In various examples, the server 102 can determine, based on the location of the cursor, touch input, or other indicator associated with the selection, whether the selected section is rendered selectable for commenting or disabled for commenting.

Based on a determination that the section is not designated as selectable for commenting ("No" at operation 806), the server 102, at operation 808, can optionally cause display of a notification that commenting is not available. The notification can include an indication that commenting associated with the selected section and/or the transcript is not available. In some examples, the notification can additionally include an indication that one or more other sections are rendered selectable for commenting.

Based on a determination that the section is designated as selectable for commenting ("Yes" at operation 806), the server 102, at operation 810, the server 102 determines whether a current time is associated with a commenting period. As discussed above, a transcript can be rendered selectable for commenting for a designated time period and/or from a publication time to a designated time and/or date. The server 102 can determine whether the current time associated with the selection is associated with the commenting period (e.g., during an active commenting period) or if the commenting period has expired.

Based on a determination that the commenting period has expired ("No" at operation 810), the server 102 can optionally cause display of a notification that commenting is not available, such as that described at operation 808.

Based on a determination that the commenting period is active ("Yes" at operation 810), the server 102, at operation 812, causes presentation, via the virtual space, of an input interface associated with the section. In at least one example, the input interface can include a messaging thread interface configured to receive input associated with a messaging thread or thread of messages associated with the selected section.

At operation 814, the server 102 receives, via the input interface, the user input associated with the section of the meeting transcript. In at least one example, the user input can include a message or comment from the user that is associated with the selected section. In some examples, the message or comment can be submitted in text format, audio format, or video format. That is, the user can input a text, audio, or video message or comment via the input interface.

At operation 816, the server 102 stores the user input as metadata associated with an audio meeting file or a video meeting file associated with the meeting. In at least one example, the server 102 stores the user input in association with the section. In some examples, the metadata can include a pointer associated with section to indicate where, in the second section, the user input is to be associated. For example, the server 102 can determine that the user input is to be associated with the section (e.g., a first section) at the end of the section and prior to another section (e.g., a second section). For another example, the server 102 can identify, utilizing natural language processing or similar techniques, content associated with the user input. The server 102 can compare the content to content associated with the section to identify a portion thereof to which the user input relates. In response to identifying the portion, the server 102 can associate a pointer to the portion of the section that is related to the comment. As such, the server 102 can cause the user input to be associated with a relevant portion of the section.

Additionally or alternatively, the server 102 can be configured to modify the audio meeting file or the video meeting file to include the user input. In at least one example, the server 102 can modify the meeting file to include the user input in association with the selected section. For example, the server 102 can identify that the selection is associated with a first section of a meeting transcript, and can receive user input associated with the first section. The server 102 can then modify the meeting file to include the user input after the first section and prior to the second section.

As discussed above, in various examples, the server 102 can be configured to modify a format of the user input to correspond with a format of the meeting file. For example, if the user input is received in text format, the server 102 can generate an audio file of the user input, and incorporate the audio file into the meeting file. For another example, the meeting file can be in a video format, and the user input can be an audio input. The server 102 can splice the video meeting file between the first section and the second section to incorporate the audio file, and can cause presentation of an image or group of images associated with the user into the video meeting file, such as to give a viewing user an indication of the user who submitted the audio input.

Figure 9:
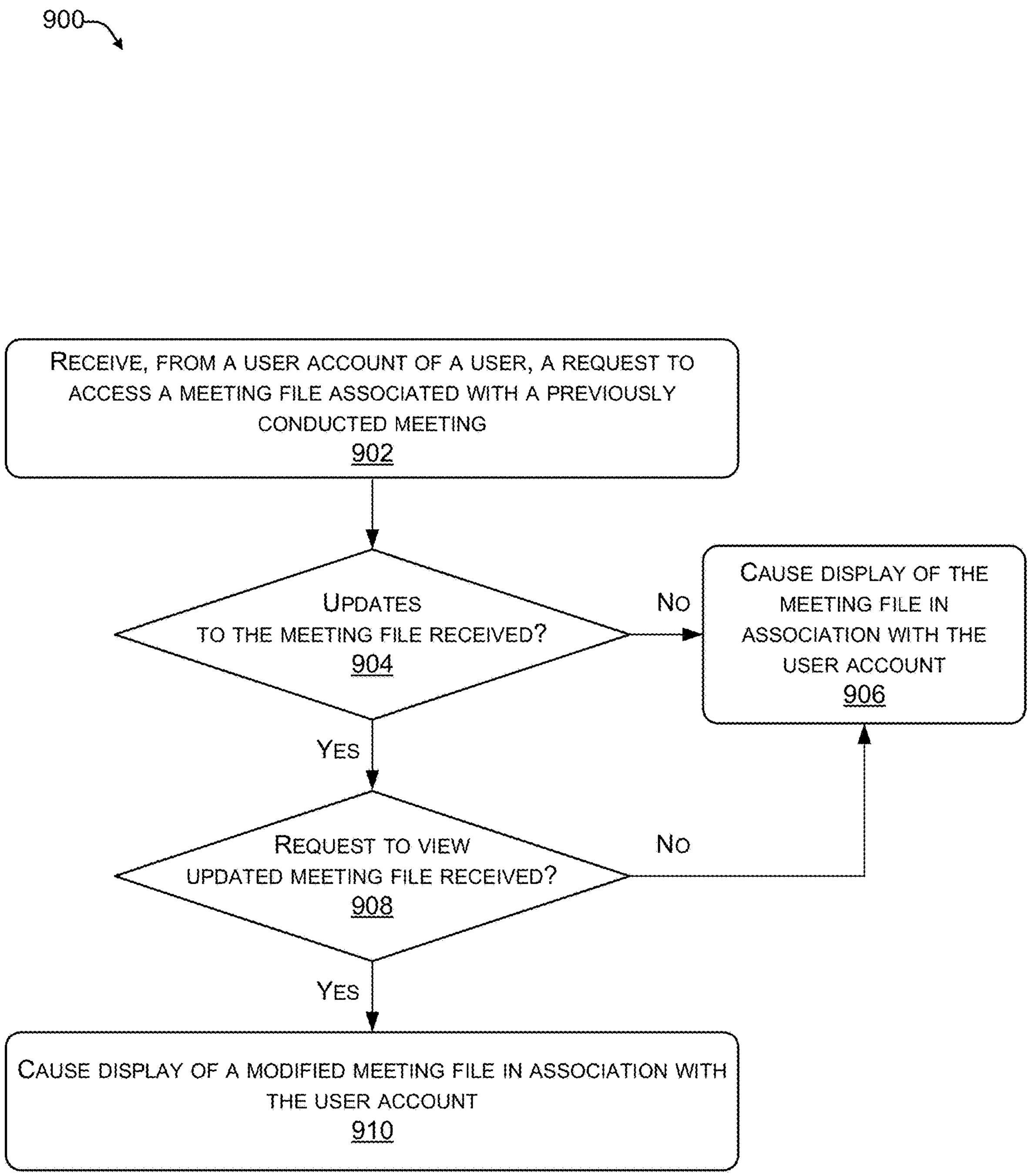
FIG. 9 is an example process for receiving a request to access a file associated with a meeting and causing presentation of at least one of the file or a modified file, the modified file including a comment associated with a section of the meeting, as described herein.

FIG. 9 illustrates an example process 900 for receiving a request to access a file associated with a meeting and causing presentation of at least one of the file or a modified file, the modified file including a comment associated with a section of the meeting, as described herein.

At operation 902, a server 102 receives, from a user account of a user, a request to access a meeting file associated with a previously conducted meeting. In at least one example, the request can include a selection of an affordance associated with the meeting, such as that provided in a sidebar or in association with a virtual space. For example, the user may desire to watch a previously conducted meeting, such as to view a presentation or demonstration associated therewith, that may not be included in the transcript.

At operation 904, the server 102 determines whether updates to the meeting file have been received. In at least one example, an update to the meeting file can include user inputs or comments submitted via one or more threads associated with one or more sections of a meeting transcript, as described herein. That is, the server 102 may receive a user input via a thread associated with a section of the meeting transcript, and may update the meeting file based on the user input, as described at least with respect to operation 816 of FIG. 8.

Based on a determination that the updates to the meeting file have not been received ("No" at operation 904), the server 102, at operation 906, causes display of the meeting file in association with the user account. That is, the server 102 can cause presentation of the original meeting file associated with the meeting, such as an audio or video recording of the meeting.

Based on a determination that the updates to the meeting file have been received ("Yes" at operation 904), the server 102, at operation 908, determines whether a request to view an updated meeting file has been received. In some examples, the server 102 can provide an option to the user to view the original meeting file or an updated meeting file. In such examples, the server 102 can enable the viewing user to select one or the other for viewing.

Based on a determination that the request includes a request to view the original meeting file ("No" at operation 908), the server causes display of the meeting file in association with the user account, as described with respect to operation 906.

Based on a determination that the request to view the updated meeting file is received ("Yes" at operation 908), the server 102, at operation 910, causes display of a modified meeting file in association with the user account. The modified meeting file can include data representative of the meeting and one or more comments submitted via one or more thread instances associated with a transcript of the meeting, as described herein.

Figure 10:
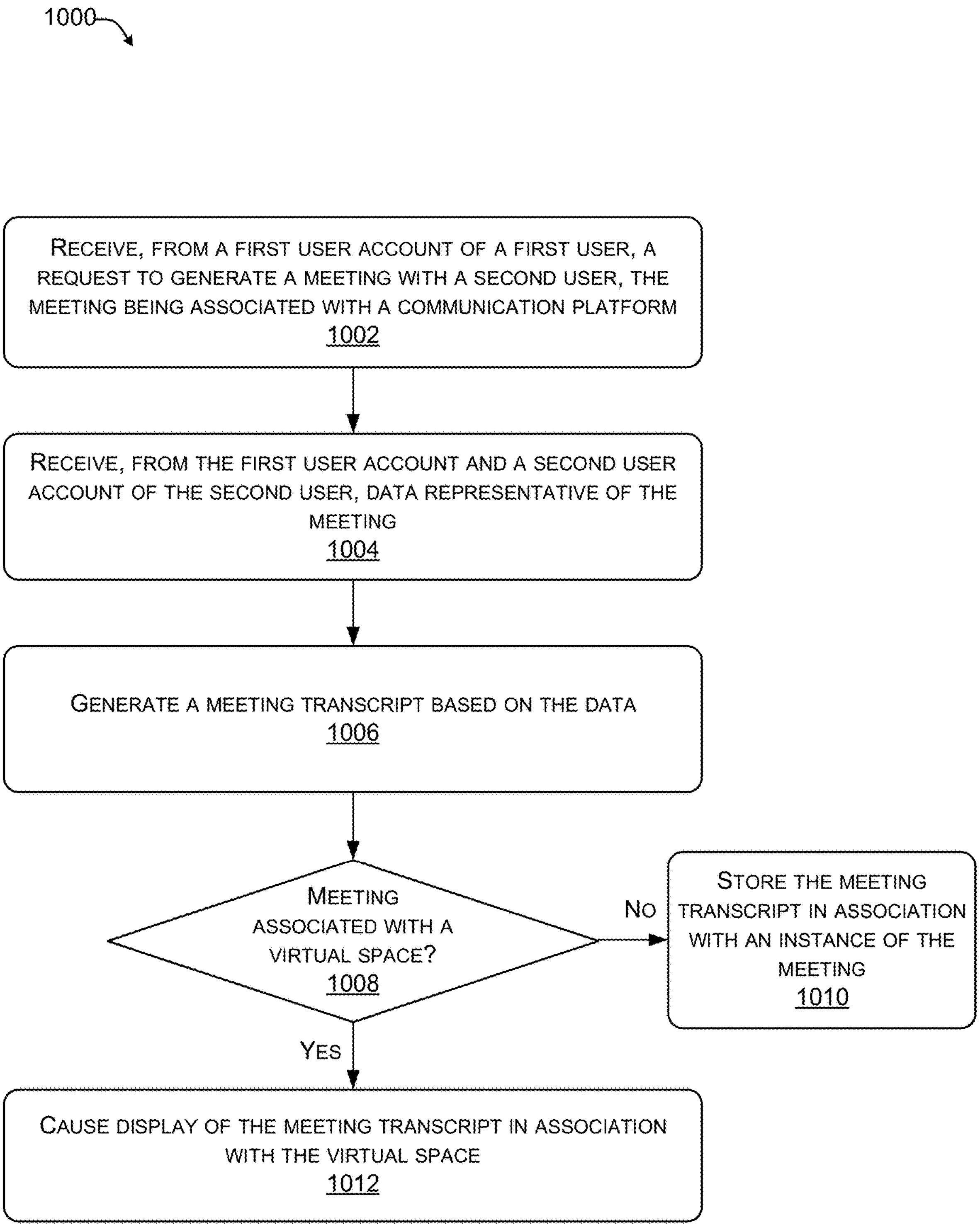
FIG. 10 is an example process for generating a transcript associated with a meeting and causing display of the transcript via a virtual space that is associated with the meeting, as described herein.

FIG. 10 illustrates an example process 1000 for generating a transcript associated with a meeting and causing display of the transcript via a virtual space that is associated with the meeting, as described herein.

At operation 1002, a server 102 receives, from a first user account of a first user, a request to generate a meeting with a second user, the meeting being associated with a communication platform. In at least one example, the request to generate the meeting can include a selection of an affordance associated with creating a meeting instance. In some examples, in response to the request, the server 102 can cause a meeting detail input box, such as meeting detail input box 416 to be presented via a user interface. In at least one example, the meeting detail input box can enable the first user to select a type of meeting to be initiated (e.g., audio, video, etc.).

In some examples, the meeting detail input box can additionally provide a means by which the first user can select one or more other users (e.g., the second user) to be invited to or participate in the meeting. In at least one example, the server 102 can provide an indication of one or more user identifiers associated with user(s) who are online and available to conduct the meeting. In some examples, the user(s) can be identified based on a relationship with the first user (e.g., boss, subordinate, friend, family, etc.). In some examples, the user(s) can be identified based on interactions with the first user via the communication platform (e.g., frequency of communications, recency of communications, etc.).

In examples in which the meeting is created or otherwise associated with a virtual space, the server 102 can identify the user(s) based on membership in the virtual space. That is, the server 102 can provide user identifier(s) associated with one or more members of the virtual space who are online and/or active on the communication platform. In at least one example, in response to receiving, from the first user account, an indication of selection of the second user and/or an identifier associated therewith, the server 102 can generate the meeting instance between the first user and the second user. Though described as being between the first user and the second user, this is not intended to be so limiting, and the meeting instance can include a greater number of participants. Additionally, in at least one example, the first user can generate a meeting instance in which the first user is the only member, such as to provide a presentation to other users that can be viewed and/or the transcript reviewed at another time (e.g., asynchronously) from the presentation. As such, a meeting including a single user is additionally contemplated herein.

At operation 1004, the server 102 receives, from the first user account and a second user account of the second user, data representative of the meeting. The data can include audio data, video data, and/or text data associated with user inputs provided during the meeting.

At operation 1006, the server 102 generates a meeting transcript based on the data. In some examples, the server 102 can generate the meeting transcript substantially concurrently with the meeting. That is, in response to receiving first data from a first user, the server 102 can include the first data in the meeting transcript, and so on. In some examples, the server 102 converts the first data into a text format, such as utilizing speech-to-text technologies. In some examples, the server 102 processes the data representative of the meeting and generates the meeting transcript in response to receiving an indication that the meeting is complete. In such examples, the indication that the meeting is complete can include an administrator or host ending the meeting, a threshold number or percentage of users leaving the meeting instance, or the like.

At operation 1008, the server 102 determines whether the meeting is associated with a virtual space. In some examples, the first user can generate the meeting in association with the virtual space. For example, the first user can select an affordance associated with generating a meeting that is presented via a user interface associated with the virtual space. Based on the selection of the affordance presented in association with the virtual space, the server 102 can generate the meeting instance in association with the virtual space, such that data associated with the meeting can be stored in association with the virtual space.

In some examples, the first user can generate the meeting independent of the virtual space and can be configured to later share the contents thereof via a virtual space. For example, the first user and the second user can conduct the meeting via a private direct messaging instance. After the meeting, the first user can request to share the meeting (e.g., meeting file, meeting transcript) via the virtual space. In response to the request, the server 102 can associate the meeting with the virtual space.

Based on a determination that the meeting is not associated with a virtual space ("No" at operation 1008), the server 102, at operation 1010, stores the meeting transcript in association with an instance of the meeting. In some examples, the server 102 can render the meeting file and/or the meeting transcript accessible to the first user and/or the second user, such as to review the contents thereof at another time. In some examples, the instance of the meeting can be associated with a private space associated with a user account of a meeting attendee. In some examples, the private space can include one or more virtual spaces that are privately accessible to the meeting attendee. In some examples, the instance of the meeting can be stored in association with a private space corresponding to an administrator or host of the meeting. That is, the instance of the meeting and data associated therewith (e.g., meeting file, transcript, etc.) can be stored in association with a private space associated with a user account of the administrator or host of the meeting.

In some examples, the server 102 can receive, via a meeting interface associated with the meeting, a request to create a virtual space (e.g., channel, etc.) associated with the meeting. In such examples, the server 102 can create the virtual space associated with the meeting and can store the meeting transcript in association with the virtual space created during the meeting.

Based on a determination that the meeting is associated with a virtual space ("Yes" at operation 1008), the server 102, at operation 1012, causes display of the meeting transcript in association with the virtual space. In at least one example, the meeting transcript can be published in a message transmitted via the virtual space, such that it is viewable to members of the virtual space. In some examples, the message can include an automated message generated by the communication platform.

Figure 11:
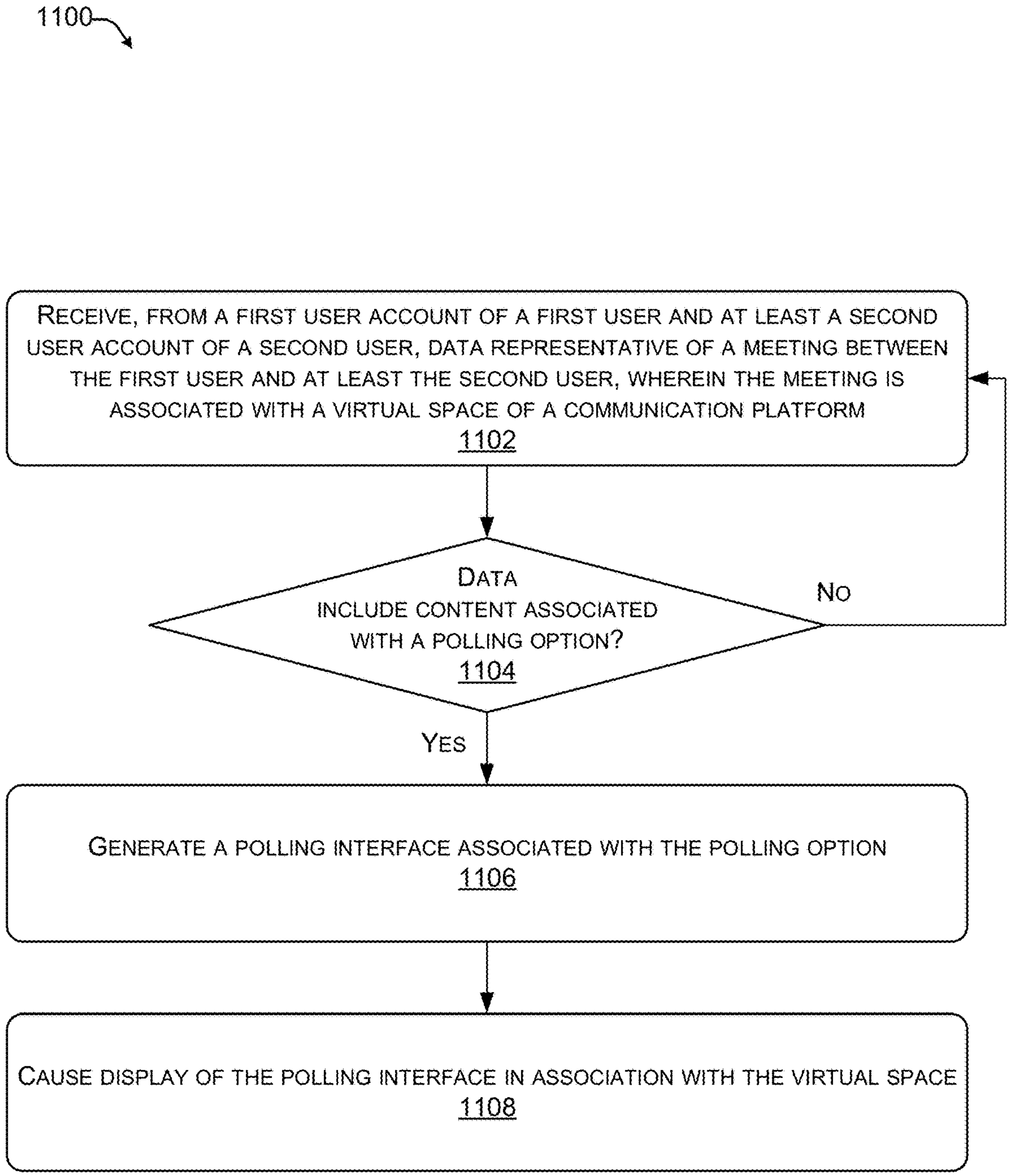
FIG. 11 is an example process for providing a polling interface associated with a meeting via a virtual space based on content included in the meeting, as described herein.

FIG. 11 illustrates an example process 1100 for providing a polling interface associated with a meeting via a virtual space based on content included in the meeting, as described herein.

At operation 1102, a server 102 receives, from a first user account of a first user and at least a second user account of a second user, data representative of a meeting between the first user and at least the second user, wherein the meeting is associated with a virtual space of a communication platform. The data can include audio data, video data, and/or text data associated with user inputs provided during the meeting.

At operation 1104, the server 102 determines whether the data includes content associated with a polling option. In at least one example, the server 102 can be configured to analyze the data representative of the meeting (e.g., words exchanged in conversation) to identify a poll associated with the meeting. In some examples, the server 102 can be configured to identify keywords associated with a potential poll, such as "poll," "vote," "feedback," and/or the like. In such examples, in response to identifying a keyword, the server 102 can identify the poll associated with the meeting. In some examples, based on an analysis of the data, the server 102 can identify polling characteristics associated with the poll. Non-limiting examples of polling characteristics include question(s) or options to be included in the poll, topic(s) to be associated with an input box in which other users can submit their input, a period of time to render the poll available for input, input anonymity, and/or the like.

In some examples, the server 102 determines that the data includes content associated with the polling option based on an instruction from an administrator or host or another meeting attendee to generate a polling interface. In some examples, the instruction can include polling characteristics, as described herein.

Based on a determination that the data does not include content associated with a polling option ("No" at operation 1104), the server 102 continues to receive the data representative of the meeting. In at least one example, the server 102 can store the data representative of the meeting in a meeting file. In some examples, the server 102 stores the data in the meeting file until receiving an indication that the meeting is complete. In some examples, the indication that the meeting is complete can include an indication that an administrator or host has stopped the meeting, that a threshold number or percentage of meeting attendees have left the meeting, that no data has been received for a threshold period of time (e.g., 3 minutes, 5 minutes, etc.), and/or the like.

Based on a determination that the data does include content associated with the polling option ("Yes" at operation 1104), the server 102, at operation 1106, generates a polling interface associated with the polling option. In at least one example, the server 102 can generate the polling interface based on the polling characteristics. In some examples, the server 102 can render one or more sections of the polling interface anonymous, such as based on input anonymity. In some examples, the server 102 can provide an option, via the polling interface, for the viewing user to submit answers to a poll anonymously. In such examples, the server 102 generates the polling interface with the option.

At operation 1108, the server 102 causes display of the polling interface in association with the virtual space. In at least one example, the server 102 causes display, via the virtual space, of an affordance that, when selected by a viewing user, causes the polling interface to be presented in association with the virtual space. The server 102 can receive user inputs via the polling interface and generate results to the poll. In some examples, the results can include individual results and/or aggregated results from multiple users. In some examples, the server 102 can render the results available for members of the virtual space to view. In some examples, the server 102 can provide the results to an administrator or host of the meeting, and/or the user who requested that the poll be associated with the meeting.

As such, techniques described herein provide specific, technical solutions to technical problems faced by existing systems, the details of which are described above.

EXAMPLE CLAUSES

A: A method implemented at least in part by one or more computing devices of a communication platform, the method comprising: receiving, from a first user account of a first user, a first selection of a meeting transcript published via a virtual space, wherein the meeting transcript comprises a transcript of an audio meeting file or a video meeting file, the audio meeting file or the video meeting file being associated with a meeting previously conducted in association with the communication platform; in response to identifying a first section of the meeting transcript associated with the first selection, causing display, via the virtual space, of an input interface associated with the first section, wherein the input interface is configured to receive a first user input associated with the meeting transcript; receiving, via the input interface, the first user input associated with the first section of the meeting transcript; and storing the first user input as metadata associated with the audio meeting file or the video meeting file, wherein the first user input is stored in association with the first section.

B: The method of paragraph A, further comprising modifying the audio meeting file or the video meeting file to include the first user input.

C: The method of paragraph B, further comprising: receiving a request to access a modified audio meeting file or a modified video meeting file, the modified audio meeting file or the modified video meeting file comprising at least the first section, the first user input, and a second section of the meeting transcript that is different from the first section; and in response to receiving the request, causing display of the first section followed by the first user input, followed by a second section.

D: The method of any one of paragraphs A-C, further comprising: causing display of, in association with a second user account of a second user, the first section and the first user input that is associated with the first section; receiving, from the second user account, a second user input comprising a reply to the first user input; and modifying the metadata associated with the audio meeting file or the video meeting file to include the second user input between the first user input and a second section of the meeting transcript.

E: The method of any one of paragraphs A-D, further comprising: prior to receiving the first selection of the meeting transcript, receiving, from the first user account of the first user, a request to generate the meeting with a second user, wherein the meeting is associated with the virtual space; receiving, from the first user account and a second user account associated with a second user, data representative of the meeting; storing the data as the audio meeting file or the video meeting file; in response to receiving an indication that the meeting is complete, generating the meeting transcript associated with the audio meeting file or the video meeting file; and causing display of the meeting transcript in association with the virtual space.

F: The method of paragraph E, wherein the data representative of the meeting comprises a first comment by the first user and a second comment by the second user, the method further comprising: identifying a first timestamp associated with the first comment and a second timestamp associated with the second comment; and based at least in part on the first timestamp and the second timestamp, identifying an order of presentation of the first comment and the second comment, wherein causing display of the meeting transcript comprises causing display of the first comment with the first timestamp and the second comment with the second timestamp in the order of presentation.

G: The method of any one of paragraphs A-F, further comprising: prior to receiving the first selection of the meeting transcript, receiving, from a second user account associated with a second user and a third user account associated with a third user, data representative of the meeting, wherein the meeting is conducted between at least the second user and the third user independent of the virtual space; generating the meeting transcript associated with the meeting based at least in part on the data; receiving, from at least one of the second user account or the third user account, a request to associate the meeting with the virtual space; and in response to receiving the request, causing display of the meeting transcript in association with the virtual space, wherein a publication of the meeting transcript via the virtual space enables at least the first user to modify the audio meeting file or the video meeting file.

H: The method of any one of paragraphs A-G, further comprising: receiving audio data or video data representative of the meeting; analyzing the audio data or the video data to identify a polling option associated with the meeting; generating a polling interface associated with the polling option; and causing the polling interface to be presented in association with the virtual space.

I: A system comprising: one or more processors; and one or more non-transitory computer-readable media storing instructions that, when executed by the one or more processors, cause the system to perform operations comprising: receiving, from a first user account of a first user, a first selection of a meeting transcript published via a virtual space, wherein the meeting transcript comprises a transcript of an audio meeting file or a video meeting file, the audio meeting file or the video meeting file being associated with a meeting previously conducted in association with a communication platform; in response to identifying a first section of the meeting transcript associated with the first selection, causing display, via the virtual space, of an input interface associated with the first section, wherein the input interface is configured to receive a first user input associated with the meeting transcript; receiving, via the input interface, the first user input associated with the first section of the meeting transcript; and storing the first user input as metadata associated with the audio meeting file or the video meeting file, wherein the first user input is stored in association with the first section.

J: The system of paragraph I, the operations further comprising modifying the audio meeting file or the video meeting file to include the first user input.

K: The system of paragraph J, the operations further comprising: receiving a request to access a modified audio meeting file or a modified video meeting file, the modified audio meeting file or the modified video meeting file comprising at least the first section, the first user input, and a second section of the meeting transcript that is different from the first section; and in response to receiving the request, causing display of the first section followed by the first user input, followed by a second section.

L: The system of any one of paragraphs I-K, the operations further comprising: causing display of, in association with a second user account of a second user, the first section and the first user input that is associated with the first section; receiving, from the second user account, a second user input comprising a reply to the first user input; and modifying the metadata associated with the audio meeting file or the video meeting file to include the second user input between the first user input and a second section of the meeting transcript.

M: The system of any one of paragraphs I-L, the operations further comprising: prior to receiving the first selection of the meeting transcript, receiving, from the first user account of the first user, a request to generate the meeting with a second user, wherein the meeting is associated with the virtual space; receiving, from the first user account and a second user account associated with a second user, data representative of the meeting; storing the data as the audio meeting file or the video meeting file; in response to receiving an indication that the meeting is complete, generating the meeting transcript associated with the audio meeting file or the video meeting file; and causing display of the meeting transcript in association with the virtual space.

N: The system of paragraph M, wherein the data representative of the meeting comprises a first comment by the first user and a second comment by the second user, the operations further comprising: identifying a first timestamp associated with the first comment and a second timestamp associated with the second comment; and based at least in part on the first timestamp and the second timestamp, identifying an order of presentation of the first comment and the second comment, wherein causing display of the meeting transcript comprises causing display of the first comment with the first timestamp and the second comment with the second timestamp in the order of presentation.

O: The system of any one of paragraphs I-N, the operations further comprising: prior to receiving the first selection of the meeting transcript, receiving, from a second user account associated with a second user and a third user account associated with a third user, data representative of the meeting, wherein the meeting is conducted between at least the second user and the third user independent of the virtual space; generating the meeting transcript associated with the meeting based at least in part on the data; receiving, from at least one of the second user account or the third user account, a request to associate the meeting with the virtual space; and in response to receiving the request, causing display of the meeting transcript in association with the virtual space, wherein a publication of the meeting transcript via the virtual space enables at least the first user to modify the audio meeting file or the video meeting file.

P: The system of any one of paragraphs I-O, the operations further comprising: receiving audio data or video data representative of the meeting; analyzing the audio data or the video data to identify a polling option associated with the meeting; generating a polling interface associated with the polling option; and causing the polling interface to be presented in association with the virtual space.

Q: One or more non-transitory computer-readable media storing instructions that, when executed by one or more processors, cause the one or more processors to perform operations comprising: receiving, from a first user account of a first user, a first selection of a meeting transcript published via a virtual space, wherein the meeting transcript comprises a transcript of an audio meeting file or a video meeting file, the audio meeting file or the video meeting file being associated with a meeting previously conducted in association with a communication platform; in response to identifying a first section of the meeting transcript associated with the first selection, causing display, via the virtual space, of an input interface associated with the first section, wherein the input interface is configured to receive a first user input associated with the meeting transcript; receiving, via the input interface, the first user input associated with the first section of the meeting transcript; and storing the first user input as metadata associated with the audio meeting file or the video meeting file, wherein the first user input is stored in association with the first section.

R: The one or more non-transitory computer-readable media of paragraph Q, the operations further comprising modifying the audio meeting file or the video meeting file to include the first user input.

S: The one or more non-transitory computer-readable media of paragraph R, the operations further comprising: receiving a request to access a modified audio meeting file or a modified video meeting file, the modified audio meeting file or the modified video meeting file comprising at least the first section, the first user input, and a second section of the meeting transcript that is different from the first section; and in response to receiving the request, causing display of the first section followed by the first user input, followed by a second section.

T: The one or more non-transitory computer-readable media of any one of paragraphs Q S, the operations further comprising: causing display of, in association with a second user account of a second user, the first section and the first user input that is associated with the first section; receiving, from the second user account, a second user input comprising a reply to the first user input; and modifying the metadata associated with the audio meeting file or the video meeting file to include the second user input between the first user input and a second section of the meeting transcript.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method implemented at least in part by one or more computing devices of a communication platform, the method comprising:

receiving, via the communication platform, an indication of a meeting between two or more users of the communication platform;

generating, in association with the meeting between the two or more users of the communication platform, a meeting transcript, wherein the meeting transcript comprises a transcript of an audio meeting file associated with the meeting or a video meeting file associated with the meeting;

determining, based at least in part on a setting associated with the meeting, one or more sections of the meeting transcript renderable as one or more selectable sections, wherein a selectable section of the one or more selectable sections is selectable for user interaction by attendees of the meeting between the two or more users of the communication platform, for a predetermined period of time;

generating, for publication via a virtual space of the communication platform, the meeting transcript;

receiving, within the predetermined period of time and from a first user account of a first user of the communication platform, a first selection of the meeting transcript;

in response to identifying a first selectable section of the one or more selectable sections that is associated with the first selection of the meeting transcript, causing display, via the virtual space, of an input interface associated with the first selectable section, wherein the input interface is configured to receive a first user input associated with the first selectable section;

receiving, via the input interface, the first user input associated with the first selectable section;

generating modified first user input by modifying a format of the first user input associated with the first selectable section to correspond to a meeting file format, wherein modifying the format of the first user input associated with the first selectable section comprises at least one of:

converting the first user input associated with the first selectable section from a text format to an audio format; and causing, in association with the video meeting file, presentation of an avatar or user image associated with the first user account of the first user of the communication platform;

storing the modified first user input as metadata associated with the audio meeting file or the video meeting file; and rendering, based at least in part on determining that the predetermined period of time has lapsed, the one or more selectable sections as not selectable for user interaction.

2. The method of claim 1, further comprising modifying the audio meeting file or the video meeting file to include the modified first user input.

3. The method of claim 2, further comprising:

receiving a request to access a modified audio meeting file or a modified video meeting file, the modified audio meeting file or the modified video meeting file comprising at least the first selectable section, the modified first user input, and a second section of the meeting transcript that is different from the first selectable section; and in response to receiving the request to access the modified audio meeting file or the modified video meeting file, presenting the first selectable section followed by the modified first user input, followed by the second section of the meeting transcript.

4. The method of claim 1, further comprising:

presenting, in association with a second user account of a second user of the communication platform, the first selectable section and the modified first user input;

receiving, within the predetermined period of time and from the second user account of the second user of the communication platform, a second user input comprising a reply to the modified first user input; and modifying the metadata associated with the audio meeting file or the video meeting file to include the second user input between the modified first user input and a second section of the meeting transcript.

5. The method of claim 1, further comprising:

prior to receiving the first selection of the meeting transcript, receiving, from the first user account of the first user of the communication platform, a request to generate the meeting with a second user of the communication platform, wherein the meeting is associated with the virtual space;

receiving, from the first user account of the first user of the communication platform and a second user account of the second user of the communication platform, data representative of the meeting;

storing the data as the audio meeting file or the video meeting file;

in response to receiving an indication that the meeting is complete, publishing an automated message comprising the meeting transcript; and causing display of the meeting transcript in association with the virtual space.

6. The method of claim 5, wherein the data representative of the meeting comprises a first comment by the first user of the communication platform and a second comment by the second user of the communication platform, the method further comprising:

identifying a first timestamp associated with the first comment and a second timestamp associated with the second comment; and based at least in part on the first timestamp and the second timestamp, identifying an order of presentation of the first comment and the second comment, wherein causing display of the meeting transcript comprises causing display of the first comment and the second comment in the order of presentation.

7. The method of claim 1, further comprising:

prior to receiving the first selection of the meeting transcript, receiving, from a second user account of a second user of the communication platform and a third user account of a third user of the communication platform, data representative of the meeting, wherein the meeting is conducted between at least the second user of the communication platform and the third user of the communication platform independently of the virtual space;

generating the meeting transcript based at least in part on the data representative of the meeting;

receiving, from at least one of the second user account of the second user of the communication platform or the third user account of the third user of the communication platform, a request to associate the meeting with the virtual space; and in response to receiving the request to associate the meeting with the virtual space, publishing an automated message comprising the meeting transcript via the virtual space, wherein publication of the automated message via the virtual space enables at least the first user of the communication platform to modify the audio meeting file or the video meeting file.

8. The method of claim 1, further comprising:

receiving audio data or video data representative of the meeting;

analyzing the audio data or the video data to identify a polling option associated with the meeting;

generating a polling interface associated with the polling option; and causing the polling interface to be presented in association with the virtual space.

9. A system comprising:

one or more processors; and one or more non-transitory computer-readable media storing instructions that, when executed by the one or more processors, cause the system to perform operations comprising:

receiving, via a communication platform, an indication of a meeting between two or more users of the communication platform;

generating, in association with the meeting between the two or more users of the communication platform, a meeting transcript, wherein the meeting transcript comprises a transcript of an audio meeting file or a video meeting file associated with the meeting;

determining, based at least in part on a setting associated with the meeting, one or more sections of the meeting transcript renderable as one or more selectable sections, wherein a selectable section of the one or more selectable sections is selectable, for user interaction by attendees of the meeting between the two or more users of the communication platform, for a predetermined period of time;

generating, for publication via a virtual space of the communication platform, the meeting transcript;

receiving, within the predetermined period of time and from a first user account of a first user of the communication platform, a first selection of the meeting transcript;

in response to identifying a first selectable section of the one or more selectable sections that is associated with the first selection of the meeting transcript, causing display, via the virtual space, of an input interface associated with the first selectable section, wherein the input interface is configured to receive a first user input associated with the first selectable section;

receiving, via the input interface, the first user input associated with the first selectable section;

generating modified first user input by modifying a format of the first user input associated with the first selectable section to correspond to a meeting file format, wherein modifying the format of the first user input associated with the first selectable section comprises at least one of:

converting the first user input associated with the first selectable section from a text format to an audio format; and causing, in association with the video meeting file, presentation of an avatar or user image associated with the first user account of the first user of the communication platform;

storing the modified first user input as metadata associated with the audio meeting file or the video meeting file; and rendering, based at least in part on determining that the predetermined period of time has lapsed, the one or more selectable sections as not selectable for user interaction.

10. The system of claim 9, the operations further comprising modifying the audio meeting file or the video meeting file to include the modified first user input.

11. The system of claim 10, the operations further comprising:

receiving a request to access a modified audio meeting file or a modified video meeting file, the modified audio meeting file or the modified video meeting file comprising at least the first selectable section, the modified first user input, and a second section of the meeting transcript that is different from the first selectable section; and in response to receiving the request to access the modified audio meeting file or the modified video meeting file, presenting the first selectable section followed by the modified first user input, followed by the second section.

12. The system of claim 9, the operations further comprising:

presenting, in association with a second user account of a second user of the communication platform, the first selectable section and the modified first user input;

receiving, within the predetermined period of time and from the second user account of the second user of the communication platform, a second user input comprising a reply to the first user input associated with the first selectable section; and modifying the metadata associated with the audio meeting file or the video meeting file to include the second user input between the modified first user input and a second section of the meeting transcript.

13. The system of claim 9, the operations further comprising:

prior to receiving the first selection of the meeting transcript, receiving, from the first user account of the first user of the communication platform, a request to generate the meeting with a second user of the communication platform, wherein the meeting is associated with the virtual space;

receiving, from the first user account of the first user of the communication platform and a second user account of the second user of the communication platform, data representative of the meeting;

storing the data as the audio meeting file or the video meeting file;

in response to receiving an indication that the meeting is complete, publishing an automated message comprising the meeting transcript; and causing display of the meeting transcript in association with the virtual space.

14. The system of claim 13, wherein the data representative of the meeting comprises a first comment by the first user of the communication platform and a second comment by the second user of the communication platform, the operations further comprising:

identifying a first timestamp associated with the first comment and a second timestamp associated with the second comment; and based at least in part on the first timestamp and the second timestamp, identifying an order of presentation of the first comment and the second comment, wherein causing display of the meeting transcript comprises causing display of the first comment with the first timestamp and the second comment with the second timestamp in the order of presentation.

15. The system of claim 9, the operations further comprising:

prior to receiving the first selection of the meeting transcript, receiving, from a second user account of a second user of the communication platform and a third user account of a third user of the communication platform, data representative of the meeting, wherein the meeting is conducted between at least the second user of the communication platform and the third user of the communication platform independently of the virtual space;

generating the meeting transcript based at least in part on the data representative of the meeting;

receiving, from at least one of the second user account of the second user of the communication platform or the third user account of the third user of the communication platform, a request to associate the meeting with the virtual space; and in response to receiving the request to associate the meeting with the virtual space, publishing an automated message comprising the meeting transcript via the virtual space, wherein publication of the automated message via the virtual space enables at least the first user of the communication platform to modify the audio meeting file or the video meeting file.

16. The system of claim 9, the operations further comprising:

receiving audio data or video data representative of the meeting;

analyzing the audio data or the video data to identify a polling option associated with the meeting;

generating a polling interface associated with the polling option; and causing the polling interface to be presented in association with the virtual space.

17. One or more non-transitory computer-readable media storing instructions that, when executed by one or more processors, cause the one or more processors to perform operations comprising:

receiving, via a communication platform, an indication of a meeting between two or more users of the communication platform;

generating, in association with the meeting between the two or more users of the communication platform, a meeting transcript, wherein the meeting transcript comprises a transcript of an audio meeting file or a video meeting file associated with the meeting;

determining, based at least in part on an organization preference associated with an organization hosting the meeting, one or more sections of the meeting transcript renderable as one or more selectable sections, the one or more sections of the meeting transcript associated with respective user identifiers of predetermined meeting personnel, wherein a selectable section of the one or more selectable sections is selectable, for user interaction by attendees of the meeting between the two or more users of the communication platform, for a predetermined period of time;

generating, for publication via a virtual space of the communication platform, the meeting transcript;

receiving, within the predetermined period of time and from a first user account of a first user of the communication platform, a first selection of the meeting transcript;

in response to identifying a first selectable section of the one or more selectable sections that is associated with the first selection of the meeting transcript, causing display, via the virtual space, of an input interface associated with the first selectable section, wherein the input interface is configured to receive a first user input associated with the first selectable section;

receiving, via the input interface, the first user input associated with the first selectable section;

generating modified first user input by modifying a format of the first user input associated with the first selectable section to correspond to a meeting file format;

wherein modifying the format of the first user input associated with the first selectable section comprises at least one of:

converting the first user input associated with the first selectable section from a text format to an audio format; and causing, in association with the video meeting file, presentation of an avatar or user image associated with the first user account of the first user of the communication platform;

storing the modified first user input as metadata associated with the audio meeting file or the video meeting file; and rendering, based at least in part on determining that the predetermined period of time has lapsed, the one or more selectable sections as not selectable for user interaction.

18. The one or more non-transitory computer-readable media of claim 17, the operations further comprising modifying the audio meeting file or the video meeting file to include the modified first user input.

19. The one or more non-transitory computer-readable media of claim 18, the operations further comprising:

receiving a request to access a modified audio meeting file or a modified video meeting file, the modified audio meeting file or the modified video meeting file comprising at least the first selectable section, the modified first user input, and a second section of the meeting transcript that is different from the first selectable section; and in response to receiving the request to access the modified audio meeting file or the modified video meeting file, presenting the first selectable section followed by the modified first user input, followed by the second section.

20. The one or more non-transitory computer-readable media of claim 17, the operations further comprising:

presenting, in association with a second user account of a second user of the communication platform, the first selectable section and the modified first user input;

receiving, within the predetermined period of time and from the second user account of the second user of the communication platform, a second user input comprising a reply to the modified first user input; and modifying the metadata associated with the audio meeting file or the video meeting file to include the second user input between the modified first user input and a second section of the meeting transcript.

* * * * *